(12) United States Patent
Schwindt

(10) Patent No.: US 12,034,721 B2
(45) Date of Patent: Jul. 9, 2024

(54) SYSTEMS AND METHODS FOR AUTHENTICATING DATA TRANSMISSIONS TO VEHICLE

(71) Applicant: GE Aviation Systems Limited, Cheltenham (GB)

(72) Inventor: Stefan Alexander Schwindt, Cheltenham (GB)

(73) Assignee: GE AVIATION SYSTEMS LIMITED, Cheltenham (GB)

(*) Notice: Subject to any disclaimer, the term of this patent is extended or adjusted under 35 U.S.C. 154(b) by 249 days.

(21) Appl. No.: 16/428,665

(22) Filed: May 31, 2019

(65) Prior Publication Data
US 2019/0372975 A1 Dec. 5, 2019

(30) Foreign Application Priority Data
Jun. 1, 2018 (EP) .................................. 18175564

(51) Int. Cl.
*H04L 9/40* (2022.01)
*H04W 4/40* (2018.01)
*H04W 12/06* (2021.01)

(52) U.S. Cl.
CPC ...... *H04L 63/0876* (2013.01); *H04L 63/0428* (2013.01); *H04W 4/40* (2018.02); *H04W 12/06* (2013.01)

(58) Field of Classification Search
CPC ............. G06F 21/44; G06F 2221/2111; G08G 5/0013; G08G 5/0021; H04L 63/0428; H04L 63/0876; H04L 63/101; H04W 12/06; H04W 4/023; H04W 4/40; H04W 4/44
See application file for complete search history.

(56) References Cited

U.S. PATENT DOCUMENTS

| 4,903,298 A | 2/1990 | Cline |
| 6,675,095 B1 | 1/2004 | Bird et al. |
| 6,677,888 B2 | 1/2004 | Roy |

(Continued)

FOREIGN PATENT DOCUMENTS

| CN | 102017779 A | 9/2014 |
| CN | 104461278 A | 3/2015 |

(Continued)

OTHER PUBLICATIONS

European Search Report from EP Appl. No. 18175564, dated Nov. 15, 2018, 10 pages.

*Primary Examiner* — Harris C Wang
(74) *Attorney, Agent, or Firm* — Enang Akan; Darrow Mustafa PC

(57) ABSTRACT

Systems and methods for authenticating data transmissions are provided, such as e.g., analog radio streams received at a vehicle. In one aspect, the vehicle includes features that allow for detection and decryption of an encrypted source identifier embedded or introduced into a data transmission transmitted to the vehicle. The source identifier may be used to determine whether the source is authorized to transmit data transmissions to the vehicle and the data transmission may be authenticated accordingly. In another aspect, the vehicle includes features that determine the location of the transmitting device used to transmit the data transmission to the vehicle. The location is then used to determine whether the data transmission should be authenticated.

12 Claims, 18 Drawing Sheets

(56) References Cited

U.S. PATENT DOCUMENTS

| | | | |
|---|---|---|---|
| 7,185,197 B2 | 2/2007 | Wrench, Jr. | |
| 8,656,162 B2 | 2/2014 | Roy et al. | |
| 8,973,101 B1 | 3/2015 | Sampigethaya et al. | |
| 9,417,629 B2 | 8/2016 | Nutaro et al. | |
| 10,957,330 B2* | 3/2021 | Schwindt | G06F 3/167 |
| 2004/0113768 A1* | 6/2004 | Rodgers | G08B 25/14 |
| | | | 340/506 |
| 2009/0138942 A1* | 5/2009 | Alrabady | H04L 63/12 |
| | | | 726/4 |
| 2011/0238192 A1* | 9/2011 | Shah | G06F 21/16 |
| | | | 700/94 |
| 2015/0365384 A1* | 12/2015 | Rider Jimenez | H04L 63/0435 |
| | | | 380/252 |
| 2016/0006723 A1* | 1/2016 | Wilson | H04L 9/3263 |
| | | | 713/168 |
| 2017/0132533 A1* | 5/2017 | Darnell | G07C 5/008 |
| 2018/0061243 A1 | 3/2018 | Shloosh | |
| 2018/0131522 A1* | 5/2018 | Lawlis | H04L 9/0631 |
| 2019/0047511 A1* | 2/2019 | Link, II | G07C 9/00309 |
| 2019/0114414 A1* | 4/2019 | Hassani | G06F 8/65 |
| 2019/0121357 A1* | 4/2019 | Zhang | G05D 1/0088 |
| 2019/0187971 A1* | 6/2019 | Wang | H04W 12/04 |
| 2019/0372975 A1* | 12/2019 | Schwindt | H04L 63/0876 |

FOREIGN PATENT DOCUMENTS

| | | |
|---|---|---|
| CN | 105074682 A | 11/2015 |
| CN | 107079038 A | 8/2017 |
| EP | 3021497 A1 | 5/2016 |
| WO | 03035475 A1 | 5/2003 |
| WO | 2007042393 A1 | 4/2007 |

* cited by examiner

SYSTEMS AND METHODS FOR AUTHENTICATING DATA TRANSMISSIONS TO VEHICLE

FIELD

The present disclosure relates generally to vehicles, and more particularly to control systems for vehicles.

BACKGROUND

An aerial vehicle can rely on one or more thrust devices such as jet turbine engines, turbofan engines, and turbojet engines for propulsion of the aerial vehicle and control of movement, as well as one or more control surfaces for controlling propulsion and movement of the aerial vehicle. Control surfaces include elevators, rudders, ailerons, spoilers, flaps, slats, air brakes, or trim devices, etc. Various actuators, servo motors, and other devices may be used to manipulate control surfaces and thrust devices. In addition to the systems for propulsion and motion control, aerial vehicles often include many mission-related systems, such as communication systems, navigation systems including inertial and satellite navigation systems, flight management systems, and various avionics systems.

Such systems may include features for receiving and transmitting data transmissions at the aerial vehicle from various offboard transmitting devices associated with a source. For instance, one or more transmitting devices of an air traffic management system may communicate with an aerial vehicle to assist the aerial vehicle with departing, navigating airspace, and landing at a particular destination. Other transmitting devices may include radio beacons and other relay devices as well. Such data transmissions may include radio or voice communications, for example. While such data transmissions may generally assist flight operations, malicious actors may transmit forged or counterfeit communications to an aerial vehicle that may include erroneous instructions, messages, or even commands to control the aerial vehicle in a dangerous way.

Accordingly, methods and systems that address one or more of the challenges noted above would be useful.

BRIEF DESCRIPTION

Aspects and advantages of the disclosed technology will be set forth in part in the following description, or may be obvious from the description, or may be learned through practice of the disclosure.

In one exemplary aspect, the present disclosure is directed to a method for authenticating a data transmission received at a vehicle from a transmitting device associated with a source positioned offboard of the vehicle. The method includes receiving, by a computing system comprising one or more processors positioned in the vehicle, the data transmission associated with the source, the data transmission comprising a payload and control data indicative of the source. The method also includes determining, by the computing system, whether the source is authorized based at least in part on the control data of the data transmission. Further, the method includes generating, by the computing system, a control action based at least in part on whether the source is authorized.

In some implementations, the control data comprises a cryptographic identification of a source identifier of the source.

In further implementations, determining whether the source is authorized based at least in part on the control data of the data transmission comprises: decrypting the cryptographic identification of the source identifier; accessing a database comprising a plurality of source identifiers associated with a plurality of authorized sources; and ascertaining whether the source identifier of the data transmission matches at least one of the plurality of source identifiers associated with the plurality of authorized sources.

In some implementations, the data transmission comprises a timestamp indicative of a time the data transmission was transmitted by the transmitting device associated with the source, and wherein the control action is generated based at least in part on the timestamp.

In some further implementations, the method includes determining, by the computing system, a received time indicative of a time the data transmission was received by the vehicle. The method also includes determining, by the computing system, whether the received time of the data transmission is within a predetermined time period of the timestamp, and wherein the control action is generated based at least in part on whether the received time of the data transmission is within the predetermined time period of the timestamp.

In some implementations, the data transmission is a voice communication and the control data of the voice communication comprises a cryptographic identification of a source identifier, and wherein the cryptographic identification is a human inaudible component of the voice communication.

In some further implementations, the human inaudible component is greater than about twenty kilohertz (20 kHz).

In some implementations, the computing system of the vehicle comprises a public key associated with a private key of the source, and wherein the computing system of the vehicle is configured to use the public key to decrypt at least a portion of the data transmission encrypted by the source with the private key.

In some implementations, if the source is authorized, generating the control action comprises presenting the payload to an aircrew member of the vehicle.

In some implementations, the data transmission is an analog radio stream.

In some implementations, the method further includes determining a location of the transmitting device; accessing a transmitting device database identifying a plurality of transmitting device locations; and ascertaining whether the location of the transmitting device corresponds to at least one of the plurality of transmitting device locations identified by the transmitting device database. Wherein the control action is generated based at least in part on whether the location of the transmitting device corresponds to at least one of the plurality of transmitting device locations.

In some further implementations, determining the location of the transmitting device that transmitted the data transmission to the vehicle comprises: determining, by the computing system, a received time of the data transmission indicative of a time the data transmission was received by the vehicle; receiving, by the computing system, a timestamp indicative of a time the data transmission was transmitted by the transmitting device; determining, by the computing system, a time of flight of the data transmission from the transmitting device to the vehicle based at least in part on the timestamp and the received time of the data transmission; and ascertaining, by the computing system, a distance between the vehicle and the transmitting device based at least in part on the time of flight of the data transmission.

Moreover, in some implementations, determining the location of the transmitting device that transmitted the data transmission to the vehicle comprises: receiving, at a first receiving device positioned onboard the vehicle, a first signal of the data transmission; receiving, at a second receiving device on the vehicle, a second signal of the data transmission; wherein the second receiving device is spaced from the first receiving device, and wherein a baseline is defined between the first receiving device and the second receiving device; determining a first angle incidence of the data transmission at the first receiving device with respect to the baseline based on a phase difference between the first signal received by the first receiving device and the second signal received by the second receiving device; determining a second angle incidence of the data transmission at the second receiving device with respect to the baseline based on the phase difference between the first signal received by the first receiving device and the second signal received by the second receiving device; and triangulating, based on the first angle of incidence and the second angle of incidence, a distance between the vehicle and the transmitting device.

In another exemplary aspect, the present disclosure is directed to a method for authenticating a data transmission received at a vehicle from a transmitting device associated with a source. The method includes receiving, at the vehicle, the data transmission from the transmitting device; determining a location of the transmitting device; accessing a transmitting device database identifying a plurality of transmitting device locations; ascertaining whether the location of the transmitting device corresponds to at least one of the plurality of transmitting device locations identified by the transmitting device database; and generating a control action based at least in part on whether the location of the transmitting device corresponds to at least one of the plurality of transmitting device locations.

In some implementations, the data transmission comprises control data indicative of the source of the data transmission, and wherein the method further comprises determining, by a computing system comprising one or more processors positioned in the vehicle, a source identifier associated with the source based at least in part on the control data. The method also includes determining, by the computing system, whether the transmitting device is associated with the source based at least in part on the source identifier and the location of the transmitting device.

In some implementations, determining, by the computing system, whether the transmitting device is associated with the source based at least in part on the source identifier and the location of the transmitting device comprises accessing, by the computing system, a database associating one or more authorized transmitting devices with the source. The method also includes determining, by the computing system and based on the location of the transmitting device, whether the transmitting device matches at least one of the one or more authorized transmitting devices associated with the source. In such implementations, the control action is generated based at least in part on whether the transmitting device matches the at least one of the one or more authorized transmitting devices associated with the source.

In some further implementations, the control data comprises a cryptographic identification of the source identifier, and wherein determining the source identifier associated with the source based at least in part on the control data comprises decrypting the cryptographic identification to determine the source identifier, and wherein the data transmission is a voice communication and wherein the cryptographic identification is one of a human inaudible component and a voice distortion component of the voice communication.

In some implementations, determining the location of the transmitting device that transmitted the data transmission to the vehicle comprises determining, by a computing system positioned onboard the vehicle, a received time of the data transmission indicative of a time the data transmission was received by the vehicle. The method also includes receiving, by the computing system, a timestamp indicative of a time the data transmission was transmitted by the transmitting device. Further, the method includes determining, by the computing system, a time of flight of the data transmission from the transmitting device to the vehicle based at least in part on the timestamp and the received time of the data transmission. Moreover, the method includes ascertaining, by the computing system, a distance between the vehicle and the transmitting device based at least in part on the time of flight of the data transmission.

In some implementations, determining the location of the transmitting device that transmitted the data transmission to the vehicle comprises receiving, at a first receiving device positioned onboard the vehicle, a first signal of the data transmission. The method also includes receiving, at a second receiving device on the vehicle, a second signal of the data transmission; wherein the second receiving device is spaced from the first receiving device, and wherein a baseline is defined between the first receiving device and the second receiving device. Further, the method includes determining a first angle incidence of the data transmission at the first receiving device with respect to the baseline based on a phase difference between the first signal received by the first receiving device and the second signal received by the second receiving device. The method also includes determining a second angle incidence of the data transmission at the second receiving device with respect to the baseline based on the phase difference between the first signal received by the first receiving device and the second signal received by the second receiving device. Moreover, the method includes triangulating, based on the first angle of incidence and the second angle of incidence, a distance between the vehicle and the transmitting device.

In some further implementations, the first receiving device is a first antenna and the second receiving device is a second antenna, and wherein the first antenna and the second antenna are mechanically steered directional antennas.

In some further implementations, the first receiving device is a first antenna and the second receiving device is a second antenna, and wherein the first antenna and the second antenna are electronically steered directional antennas.

In yet exemplary aspect, the present disclosure is directed to a system for a vehicle. The system includes a communications system positioned onboard the vehicle and configured to present a voice communication. The system also includes an onboard computing system positioned onboard the vehicle. The onboard computing system includes one or more computing devices that are configured to: receive the voice communication generated by a source, the voice communication comprising a payload, control data comprising a cryptographic identification of the source, and a timestamp indicative of a time the data transmission was transmitted; decrypt the cryptographic identification to determine a source identifier of the source; access a database comprising a plurality of source identifiers associated with a plurality of authorized sources; ascertain whether the source identifier of the data transmission matches at least one of the plurality of source identifiers associated with the plurality of authorized sources; determine whether the source is authorized based at least in part on whether the source identifier of the data transmission matches at least one of the plurality of source identifiers associated with the plurality of authorized sources and the timestamp; and activate the communications system to present the voice communication based at least in part on whether the source is authorized.

In some embodiments, the onboard computing system comprises a decryption unit comprising one or more public keys associated with a private key of the source, and wherein the one or more public keys comprise a human inaudible key for decrypting a human inaudible component embedded within the voice communication.

These and other features, aspects and advantages of the disclosed technology will become better understood with reference to the following description and appended claims. The accompanying drawings, which are incorporated in and constitute a part of this specification, illustrate embodiments of the disclosed technology and, together with the description, serve to explain the principles of the disclosed technology.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
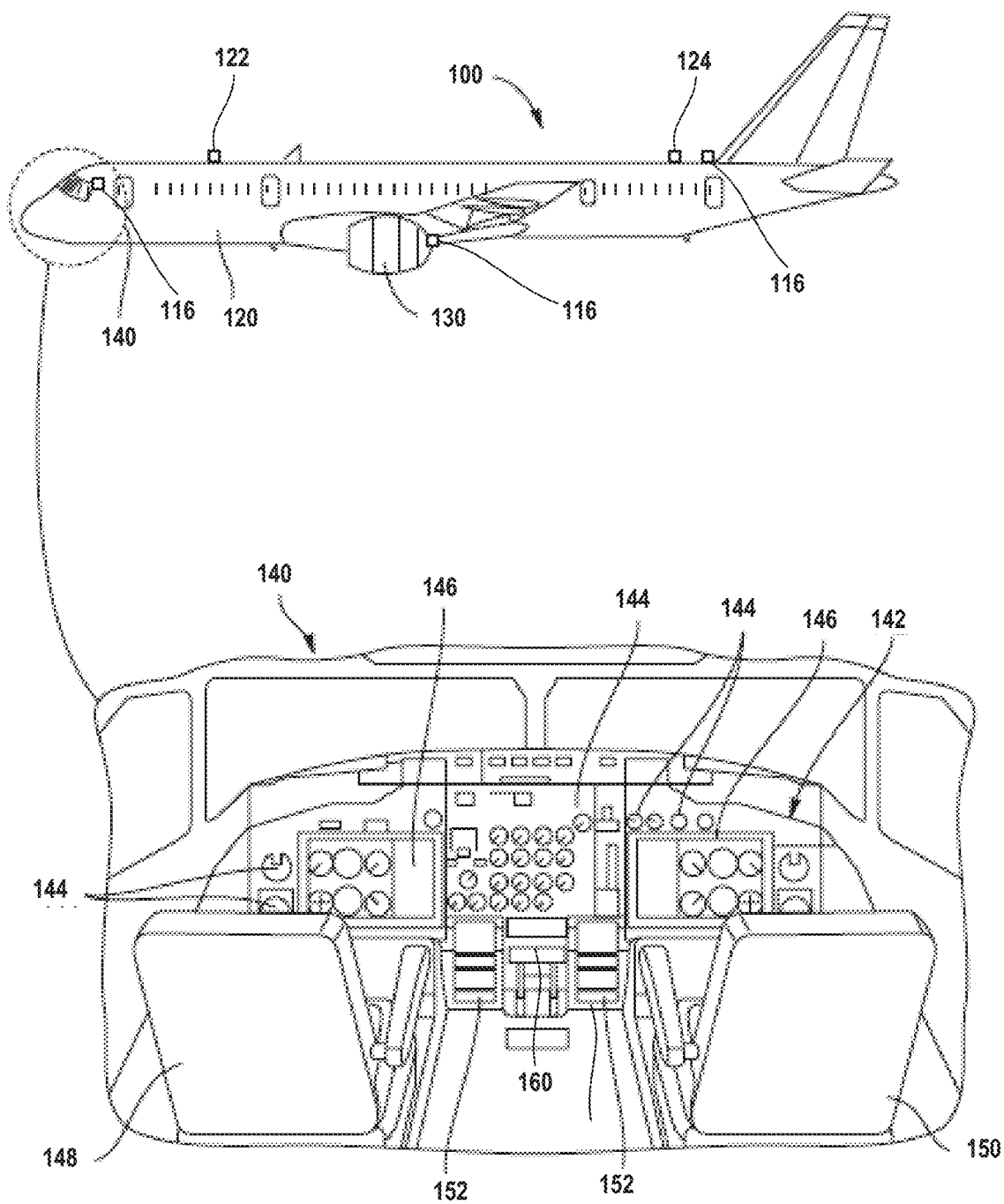
FIG. 1 is a schematic view of an example aerial vehicle and cockpit in which embodiments of the present disclosure may be practiced.

Reference now will be made in detail to embodiments of the disclosure, one or more examples of which are illustrated in the drawings. Each example is provided by way of explanation, not limitation of the disclosed embodiments. In fact, it will be apparent to those skilled in the art that various modifications and variations can be made in the present disclosure without departing from the scope or spirit of the claims. For instance, features illustrated or described as part of example embodiments can be used with another embodiment to yield a still further embodiment. Thus, it is intended that the present disclosure covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

Example aspects of the present disclosure are directed to systems and methods for authenticating a data transmission transmitted to a vehicle from a transmitting device associated with a source positioned offboard of the vehicle. As one example, the data transmission may be a voice communication transmitted over a radio communication system from an air traffic controller to an aerial vehicle, e.g., for landing instructions. As another example, the data transmission may be instructions from a pilot ground station to an unmanned aerial vehicle, e.g., for controlling the aerial vehicle. Such data transmissions are generally not authenticated by aircrew members or systems of the aerial vehicle. For instance, aircrew members or systems of the aerial vehicle do not verify or authenticate analog radio streams transmitted to aerial vehicles. Accordingly, the aerial vehicle is left exposed to malicious actors who may transmit forged or counterfeit communications to an aerial vehicle, which is undesirable. By authenticating the data transmission, crew members of the aerial vehicle or systems of the aerial vehicle can ensure that the data transmission received was generated by an authorized or trusted source. In this way, malicious actors are thwarted from fooling the aircrew members or system of the aerial vehicle with forged or counterfeit communications.

In one example aspect of the present disclosure, control data identifying a source is used to authenticate a data transmission received by a vehicle and sent by a transmitting device associated with the source. In such implementations, control data indicative of the source of the data transmission is embedded or otherwise introduced into the data transmission sent to the aerial vehicle. The control data may include a source identifier that identifies or is otherwise associated with a source of the data transmission. For example, the control data may be included as a header, footer, metadata, or as any other information included within or otherwise associated with the data transmission. The data transmission also includes a payload, or the message or instructions of the data transmission. Upon receiving the data transmission from a transmitting device associated with the source, processing units of a computing system of the vehicle determine whether the source is authorized based at least in part on the source identifier of the data transmission. Then, the computing system generates a control action based at least in part on whether the source is authorized. In some implementations, for example, generating the control action includes presenting the payload to an aircrew member of an aerial vehicle if the source is authorized. The payload may be presented automatically in some implementations. As another example, if the source is determined not to be authorized, the control action includes discarding or ignoring the data transmission without presenting the payload to the aircrew members.

In some implementations, the control data of the data transmission includes a cryptographic identification of a source identifier associated with the source of the data transmission. In such implementations, determining whether the source is authorized based at least in part on the source identifier of the data transmission includes: decrypting the cryptographic identification to determine the source identifier associated with the source of the data transmission; accessing a database comprising a plurality of source identifiers associated with a plurality of authorized sources; and ascertaining whether the source identifier of the data transmission matches at least one of the plurality source identifiers associated with the plurality of authorized sources.

For instance, in some implementations, the computing system of the vehicle includes a public key. Further, the source positioned offboard of the vehicle includes a computing system having one or more processors. The computing system of the source includes a private key. In such implementations, the computing system of the source is configured to use the private key to encrypt the data transmission prior to the computing system of the vehicle receiving the data transmission. The computing system of the vehicle is configured to use the public key to decrypt the data transmission once the data transmission is received by the computing system of the vehicle. In this way, the source identifier of the source is protected as the data transmission is transmitted, and upon receiving the data transmission, the computing system of the vehicle may utilize the public key associated with the private key to decrypt and determine the source identifier of the source. Moreover, by encrypting the source identifier with a private key, the vehicle can be configured to ignore data transmissions from malicious actors that gain access to a source identifier and attempt to send transmissions to the vehicle using an unencrypted source identifier.

In some implementations, to prevent malicious actors from copying and replaying data transmissions transmitted from authorized sources to vehicles, the data transmission includes a timestamp indicative of a time the data transmission was transmitted. In some implementations, the timestamp is encrypted as part of the encrypted source identifier. In some alternative implementations, the timestamp is not encrypted. The control action may be generated based at least in part on the timestamp.

For instance, in some implementations, the computing system of the vehicle stores a received time indicative of a time the data transmission was received by the vehicle. The received time and the timestamp may be based on the time kept by global positioning systems of the aerial vehicle and the source. The computing system then determines whether the received time of the data transmission is within a predetermined time period of the timestamp. The control action is generated based at least in part on whether the received time of the data transmission is within the predetermined time period of the timestamp. For example, if the received time of the data transmission is within the predetermined time period of the timestamp, then the vehicle has received the data transmission within a period that ensures that the data transmission was not copied and replayed by a malicious actor or inadvertently re-sent from an authorized source. If, however, the received time of the data transmission is not within the predetermined time period of the timestamp, then the time period between when the data transmission was transmitted and when the vehicle was too long. Accordingly, in some implementations, the control action includes ignoring the data transmission, even if the data transmission was or was supposedly received by an authorized source.

Further, in some instances, the data transmission is a voice communication, such as e.g., an analog radio stream. The source identifier embedded into the voice communication includes a cryptographic identification of the source identifier of the data transmission. In some implementations, for example, the cryptographic identification is a human inaudible component. For instance, the human inaudible component may be set to a frequency that is less than or below the human audible range, e.g., less than about fifteen hertz (15 Hz). Alternatively, the human inaudible component may be set to a frequency that is greater than or above the human audible range, e.g., greater than about twenty kilohertz (20 kHz). In such implementations, the computing system of the vehicle includes one or more audio processing devices that are configured to detect the human inaudible component and decipher the source identifier based upon the human inaudible component. The human inaudible component may further include a timestamp. Additionally or alternatively, in some implementations, the cryptographic identification of the source identifier may overlay a modulation of a carrier signal of the data transmission. In such implementations, the modulation can be selected such that it is inaudible to a human having normal hearing abilities and does not affect the operation of hardware of the vehicle, such as an existing demodulation of the audible signal. For instance, if the carrier signal is modulated, a sufficiently high harmonic can be chosen so that the radio system still tunes into the signal.

As one example, the transmitting device associated with the source transmits a voice communication to an aerial vehicle. The voice communication includes a payload that includes altitude and landing instructions for the aerial vehicle. The voice communication also includes control data that includes a cryptographic identification of a source identifier associated with the source. The cryptographic identification of the source is embedded into the data transmission as a human inaudible component. The computing system of the aerial vehicle receives the voice communication data transmission. The voice communication is audibly played over a speaker device of a communication system of the aerial vehicle to the crew members. The payload, audible to the human crew members and indicative of altitude and landing instructions, for example, is presented to the crew members. The embedded cryptographic identification, inaudible to the crew members, is likewise presented. One or more audio processing devices of the computing system of the aerial vehicle detect the human inaudible component and decipher the source identifier of the source based upon the human inaudible component. The source identifier is then compared against a database identifying authorized sources. If the source identifier of the data transmission matches or is otherwise associated with at least one of the plurality of authorized sources, then the source is deemed an authorized source. If the source identifier of the data transmission is not associated with at least one of the plurality of authorized sources, such as by matching one or more source identifiers (e.g., authorized source identifiers) in the database, then the source is deemed not an authorized source, or stated differently, an unauthorized source. The control action generated may include, for example, providing an indication of the source and/or a status of the source, e.g., whether the source is authorized or unauthorized. In some implementations, the onboard system may check to ensure the data transmission is associated with an authorized source first before presenting the payload. If the data transmission is not associated with an authorized source, then the payload is not presented or ignored. Further, if a timestamp was included in the data transmission, e.g., embedded within the human inaudible component, the action generated may include, for example, a notice to the crew members that the data transmission is not current or the difference between the received time and the timestamp of the transmission, e.g., the time difference between the timestamp and received time is two (2) days.

In yet other example implementations, the control data may be provided as a voice distortion component of a data transmission. For example, a source identifier or a cryptographic identification of a source identifier can be transmitted as a voice distortion component of a voice data transmission. For instance, the voice data transmission in its entirety or a portion containing control data may be distorted over the radio stream. A private key of the source may be used to distort the voice data transmission such that the pitch distortion is detectable by processing units of the computing system of the aerial vehicle yet not detectable by humans. The public key of the aerial vehicle may then decrypt the pitch alteration signal to determine the source identifier and/or to decode a payload. Once the source identifier is known, it may be determined whether the source is authorized as noted above.

In some implementations, the cryptographic identification of the source identifier includes a message digest of the data transmission. In this way, attempts by malicious actors to separate the cryptographic identification from the payload may be inhibited or curtailed. The message digest may include, for example, identifiable parts of the original signal (e.g., the carrier signal, the message or payload signal, etc.). For instance, the identifiable part of the original signal may include a pattern of all the amplitudes of the signal that are greater than a predetermined threshold. The amplitudes may then be merged into a signal and passed through an XOR gate (Exclusive OR gate). Accordingly, a malicious actor may not strip out the encrypted part of the data transmission (e.g., the timestamp and source identifier) and overlay it onto a malicious message as the amplitudes of the original signal and the signal of the malicious message would not match.

In another example aspect of the present disclosure, the location of a transmitting device associated with a source that is used to transmit a data transmission to a vehicle is utilized to authenticate the data transmission. In some implementations, the data transmission transmitted from the transmitting device is received at the vehicle, e.g., by one or more transmission receiving devices. The transmission signals received by the transmission receiving devices may be routed to a computing system of the vehicle. The computing system may then determine a location of the transmitting device that transmitted the data transmission to the vehicle. The location of the transmitting device may be determined by utilizing a triangulation method, a trilateration method, a multilateration method, or some combination thereof. Once the location of the transmitting device is known, the computing system accesses a transmitting device database that includes a plurality of transmitting device locations. That is the transmitting device database includes a list or other identification of locations (e.g., coordinates) of known transmitting devices. With the transmitting database accessed, the computing system of the vehicle ascertains whether the determined location of the transmitting device matches one of the plurality of transmitting device locations of the transmitting device database. Thereafter, a control action is generated based at least in part on whether the location of the transmitting device matches one of the plurality of transmitting device locations.

For instance, if the location of the transmitting device does indeed match one of the plurality of transmitting device locations of the transmitting device database, then the data transmission may be deemed authenticated as the data transmission was transmitted via a known transmitting device, and accordingly, the control action may include presenting the data transmission to crew members of the vehicle. If, on the other hand, the location of the transmitting device does not match one of the plurality of transmitting device locations of the transmitting device database, then the data transmission may not be authenticated, and as result, the control action may include ignoring the data transmission.

In some implementations, the data transmission includes a control data that comprises a source identifier of the source of the data transmission. In such implementations, a computing system comprising one or more processors positioned onboard the vehicle may determine the source identifier based at least in part on the control data. The computing system may also determine whether the transmitting device is associated with the source based at least in part on the source identifier and the location of the transmitting device. In some implementations, for example, determining, by the computing system, whether the transmitting device is associated with the source based at least in part on the source identifier and the location of the transmitting device includes accessing, by the computing system, a database correlating one or more authorized transmitting devices associated with the source, and thereafter, determining, by the computing system and based on the location of the transmitting device, whether the transmitting device matches one of the one or more authorized transmitting devices associated with the source. In such implementations, the control action is generated based at least in part on whether the transmitting device matches one of the one or more authorized transmitting devices associated with the source.

In addition, in some implementations, the control data includes a cryptographic identification of the source. In such implementations, determining the source identifier includes decrypting the cryptographic identification of the source identifier. In some implementations, for example, the data transmission is a voice communication and wherein the cryptographic identification is one of a human inaudible component and a voice distortion component of the voice communication.

Further, in some example implementations, the location of the transmitting device may be determined utilizing a trilateration technique. For instance, determining the location of the transmitting device that transmitted the data transmission to the vehicle may include receiving, by a computing system positioned onboard the vehicle, a received time of the data transmission indicative of a time the data transmission was received by the vehicle. Further, the method may include receiving, by the computing system, a timestamp indicative of a time the data transmission was transmitted by the transmitting device. Once the timestamp and the received time of the data transmission are received, the method includes determining, by the computing system, a time of flight of the data transmission from the transmitting device to the vehicle based at least in part on the timestamp and the received time of the data transmission. For instance, the time of flight of the data transmission can be determined as a difference between the time associated with the timestamp and the time associated with the received time. The absolute value may be taken as the time of flight. Further, once the time of flight of the data transmission is determined, the method may also include ascertaining, by the computing system, a distance between the vehicle and the transmitting device based at least in part on the time of flight of the data transmission. The determined distance may then be used to determine the location of the transmitting device. For example, the distance may be correlated against the distances of known transmitting devices positioned the determined distance away from the vehicle, e.g., by looking the known distances up in a database.

Further, in some example implementations, the location of the transmitting device may be determined utilizing a triangulation technique. For instance, determining the location of the transmitting device that transmitted the data transmission to the vehicle may include receiving, at a first receiving device positioned onboard the vehicle, a first signal of the data transmission as well as receiving, at a second receiving device on the vehicle, a second signal of the data transmission. The second receiving device is spaced from the first receiving device. A baseline is defined between the first receiving device and the second receiving device. A first angle incidence of the data transmission is determined at the first receiving device with respect to the baseline based on a phase difference between the first signal received by the first receiving device and the second signal received by the second receiving device. A second angle incidence of the data transmission is determined at the second receiving device with respect to the baseline based on the phase difference between the first signal received by the first receiving device and the second signal received by the second receiving device. Then, based on the first angle of incidence and the second angle of incidence, a distance between the vehicle and the transmitting device is triangulated. In some implementations, the first receiving device may be a first antenna and the second receiving device may be a second antenna. In some implementations, to improve the signal quality of the data transmissions, the first and second antennas are directional antennas. For instance, in some implementations, the first and second antennas are mechanically steered directional antennas. In some implementations, the first and second antennas are electronically steered directional antennas. In some implementations, the first antenna and the second antenna are spaced at least about fifty meters (50 m) from one another.

In yet another example aspect of the present disclosure, a system for a vehicle is provided that authenticates voice communications transmitted from an offboard source to a vehicle. The system includes a communications system positioned onboard the vehicle and configured to present a voice communication. For example, the communications system may include a radio communication system that is configured to present radio stream communications to the crew members of the vehicle. The system also includes an onboard computing system positioned onboard the vehicle. The onboard computing system includes one or more computing devices configured to: receive the voice communication generated by a source, the voice communication comprising a payload, control data comprising a cryptographic identification of the source, and a timestamp indicative of a time the data transmission was transmitted; decrypt the cryptographic identification to determine a source identifier of the source; access a database comprising a plurality of source identifiers associated with a plurality of authorized sources; ascertain whether the source identifier of the data transmission matches at least one of the plurality of source identifiers associated with the plurality of authorized sources; determine whether the source is authorized based at least in part on whether the source identifier of the data transmission matches at least one of the plurality of source identifiers associated with the plurality of authorized sources and the timestamp; and activate the communications system to present the voice communication based at least in part on whether the source is authorized.

In some embodiments, if the source is an authorized source, the onboard computing system may automatically respond or take action based on the payload of the data transmission. For example, a communications system of the vehicle may automatically present the voice communication. As another example, the onboard computing system may automatically switch the frequency of radio system of the vehicle. As yet another example, an autopilot system may automatically take control of the vehicle and perform one or more maneuvers, such as e.g., landing an aerial vehicle.

In some embodiments, the onboard computing system includes a decryption unit that includes one or more public keys. The public keys may be paired with or associated with a private key unique to a source. The private key is configured to decrypt the source identifier. In some embodiments, the one or more public keys include a human inaudible key for decrypting the source identifier as a human inaudible component embedded into the voice communication. In this way, the system may determine whether the source is authorized and may then authenticate or ignore the voice communication depending on whether the source is authorized. In other embodiments, the one or more public keys include a voice distortion key for decrypting a source identifier as a voice distortion component that is used to distort the voice communication. The voice distortion key may decrypt the distortion of the voice communication and may determine whether the source is authorized based on the decrypted source identifier of the source.

Embodiments of the present disclosure provide a number of technical benefits and advantages, particularly in the area of aerial vehicles. As one example, the techniques described herein enable authentication of data transmissions transmitted to aerial vehicles from offboard sources. In this way, malicious actors are prevented from spoofing the crew members of systems of the aerial vehicle with forged or counterfeit communications. Thus, such techniques described herein provide enhanced security of air traffic. As one example, a source identifier may be embedded into the data transmission. As another example, the source identifier may be encrypted as a cryptographic identification of the source. Upon receipt of the data transmission, the aerial vehicle may decrypt the cryptographic identification of the source identifier, e.g., using a public key, to determine the source identifier of the source. Once the source identifier is known, the computing system of the aerial vehicle may determine whether the source is authorized to transmit data transmissions to the aerial vehicle. Such a technique for authenticating data transmissions to an aerial vehicle may overcome shortcomings of traditional techniques that lack means for authenticating data transmissions.

Embodiments of the present disclosure additionally provide a number of technical benefits and advantages in the area of computing technology. For example, the disclosed system can determine whether a data transmission is authorized to be presented to crewmembers, or in other instances, the control systems of the aerial vehicle. If the data transmission is not authenticated, valuable computing resources need not be expended to present the data transmission to the crew members; rather, the unauthorized data transmission may be discarded. In some examples, control data can be provided with or in association with a payload including aerial vehicle communication data. The control data can be embedded with a payload in a single data transmission for instance. Such an approach can provide security for aerial vehicle transmission using small overhead when compared with traditional computing approaches.

FIG. 1 depicts an aerial vehicle 100 according to example embodiments of the present disclosure. As shown, the exemplary aerial vehicle 100 can include a fuselage 120, one or more engine(s) 130, and a cockpit 140. The engines 130 provide propulsion of and/or on-board power generation for the aerial vehicle 100. The engines 130 can be a gas turbine engine, such as e.g., a jet turbine engine, turboprop engine, turbofan engine, a turbo shaft engine, or any other suitable engine, including piston engine propellers, electrically-driven fans or propellers, or any hybrid of the above. In example embodiments, the cockpit 140 can include a flight deck 142 having various instruments 144 and flight displays 146. It will be appreciated that instruments 144 can include, without limitation, a dial, gauge, or any other suitable analog device. Although the aerial vehicle 100 is depicted as a fixed-wing aircraft, in other example embodiments the aerial vehicle may be a rotary-wing aircraft, a smaller fixed-wing aircraft, a land-air hybrid aircraft, an unmanned aerial vehicle, or some other type of aerial vehicle. Moreover, the subject matter of the present disclosure may apply to other types of vehicles, including but not limited to land-based vehicles, amphibious vehicles, watercrafts or vehicles, spacecraft, some combination thereof, etc. Further, although the one or more engines 130 are shown as turbofan engines, in other example embodiments the engines 130 may be turboprops (e.g., for smaller commuter planes), turboshafts (e.g., for helicopters), piston-driven engines, electric powerplants, and/or a hybrid electric propulsion system.

The aerial vehicle 100 may additionally include one or more sensors 116. The one or more sensors 116 can be used to detect one or more parameters related to the engine(s) 130, aerial vehicle 100, and/or atmosphere external and/or internal to the aerial vehicle. The one or more sensors 116 can communicate the one or more detected parameters to various systems such as a flight management system (FMS) and/or vehicle control system (VCS). In some implementations, the one or more sensors 116 can communicate parameters to one or more external components.

Further, in some example embodiments, the aerial vehicle 100 may include one or more receiving devices for receiving data transmissions sent from offboard transmitting devices. For instance, in this example, the receiving devices of the aerial vehicle 100 include a first antenna 122 and a second antenna 124 spaced from the first antenna 122, e.g., along the longitudinal length of the aerial vehicle 100. For instance, in some embodiments, the first antenna 122 and the second antenna 124 are spaced at least about fifty meters (50 m) from one another, e.g., along the longitudinal length of the aerial vehicle 100. In such embodiments, to improve the signal quality of data transmissions routed to the aerial vehicle 100 and the signal clarity, the first and second antennas 122, 124 are directional antennas. For example, in some embodiments, the first antenna 122 and the second antenna 124 are mechanically-steered directional antennas. In other example embodiments, the first antenna 122 and the second antenna 124 are electronically steered directional antennas. In yet other embodiments, one of the antennas 122, 124 may be a mechanically steered antenna and one of the antennas 122, 124 may be an electronically steered antenna. In some examples, aerial vehicle 100 may include a single antenna, which may or may not be directional.

A first user (e.g., a pilot) may be present in a seat 148 and a second user (e.g., a co-pilot) can be present in a seat 150. The flight deck 142 can be located in front of the pilot and co-pilot and may provide the flight crew (e.g., pilot and co-pilot) with information to aid in operating the aerial vehicle 100. The flight displays 146 can include primary flight displays (PFDs), multi-purpose control display units (MCDUs), navigation display (ND), or any suitable combination. During operation of the aerial vehicle 100, both the instruments 144 and flight displays 146 can display a wide range of vehicle, flight, navigation, and other information used in the operation and control of the aerial vehicle 100.

The instruments 144 and flight displays 146 may be laid out in any manner including having fewer or more instruments or displays. Further, the flight displays 146 need not be coplanar and need not be the same size. A touch screen display or touch screen surface (not shown) may be included in the flight displays 146 and may be used by one or more flight crew members, including the pilot and co-pilot, to interact with the aerial vehicle 100. The touch screen surface may take any suitable form including that of a liquid crystal display (LCD) and may use various physical or electrical attributes to sense inputs from the flight crew. It is contemplated that the flight displays 146 can be dynamic and that one or more cursor control devices (not shown) and/or one or more multifunction keyboards 152 can be included in the cockpit 140 and may be used by one or more flight crew members to interact with systems of the aerial vehicle 100. In this manner, the flight deck 142 may be considered a user interface between the flight crew and the aerial vehicle 100.

Additionally, the cockpit 140 can include an operator manipulated input device 160 that allow members of the flight crew to control operation of the aerial vehicle 100. In one example embodiment, the operator manipulated input device 160 can be used to control the engine power of the one or more engines 130. More specifically, the operator manipulated input device 160 can include a lever having a handle, and the lever can be movable between a first position and a second position. As such, a flight crewmember can move the lever between the first and second positions to control the engine power of the one or more engine(s) 130. It will be appreciated that the pilot can move the lever to one of a plurality of intermediate third positions disposed between the first position and the second position.

The numbers, locations, and/or orientations of the components of example aerial vehicle 100 are for purposes of illustration and discussion and are not intended to be limiting. As such, those of ordinary skill in the art, using the disclosures provided herein, will understand that the numbers, locations, and/or orientations of the components of the aerial vehicle 100 can be adjusted without deviating from the scope of the present disclosure.

Figure 2:
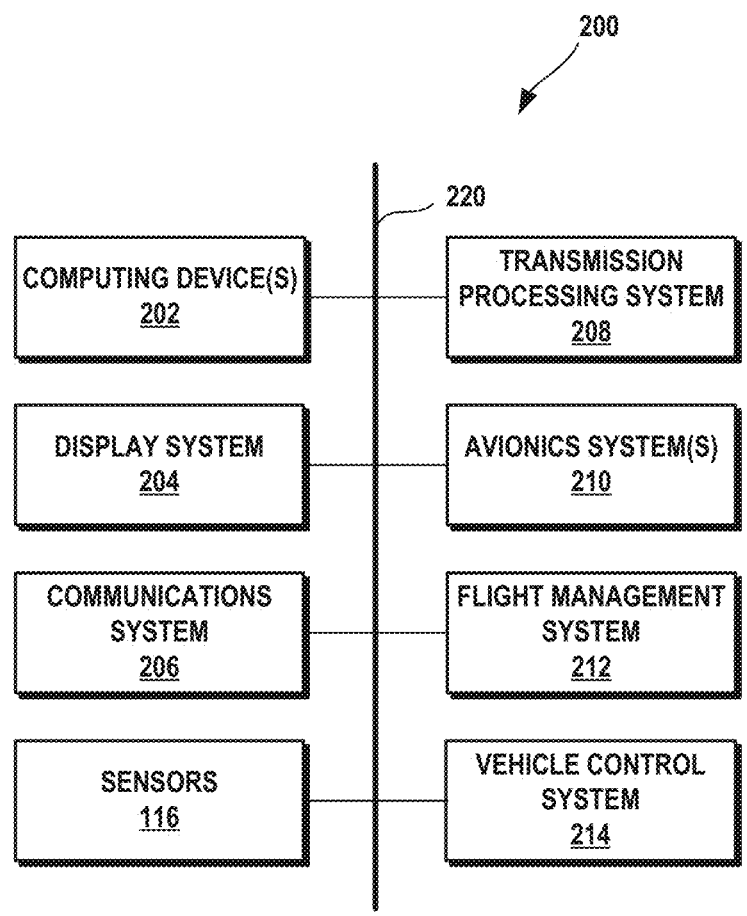
FIG. 2 is a block diagram depicting an onboard computing system of an aerial vehicle according to example embodiments of the present disclosure.

FIG. 2 depicts an example onboard computing system 200 of the aerial vehicle 100 of FIG. 1. The onboard computing system 200 can include one or more communication networks 220, including for example, one or more data buses and/or combinations of wired and/or wireless communication links. Communication networks 220 communicatively couple one or more onboard computing devices 202 to a variety of systems on the aerial vehicle 100. In FIG. 2, for example, onboard computing system 200 includes one or more onboard computing devices 202, a display system 204, a communications system 206, a transmission processing system 208, an avionics system 210, a flight management system 212, a vehicle control system 214, and sensors 116. In example embodiments, the onboard computing devices 202 may include or implement any one or combination of the systems depicted in FIG. 2.

The display system 204 may include the flight displays 146 depicted in FIG. 1 of the aerial vehicle 100. More specifically, the display system 204 can include one or more display device(s) configured to display or otherwise provide information generated or received by the onboard computing system 200. In example embodiments, information generated or received by the onboard computing system 200 can be displayed on the one or more display device(s) for viewing by flight crewmembers of the aerial vehicle 100. The display system 204 can include a primary flight display, a multipurpose control display unit, or other suitable flight displays 146 commonly included within the cockpit 140 (FIG. 1) of the aerial vehicle 100.

The communications system 206 may include one or more communication interfaces, such as e.g., an audio interface. The audio interface can include a datalink protocol for communicating over satellite, very high frequency (VHF) radio, and/or high frequency (HF) radio, such as an aircraft communications addressing and reporting system (ACARS). The aerial vehicle can include one or more receivers such as e.g., the antennas 122, 124 of FIG. 1. The receivers are configured to receive data transmissions, such as e.g., voice communications from air traffic controllers. The receivers may receive radio streams and route them to various systems of the onboard computing system 200, such as e.g., the audio interface of the communication system 206 or the transmission processing system 208. The receivers can be configured to transmit messages over a plurality of frequency bands. The frequency bands or channels used for air traffic control communication may change during flight. For example, an aerial vehicle may change communication frequencies as control is handed-off from one air traffic control tower to another air traffic control tower. Additionally, or alternatively, the communication system 206 may include one or more transmitters and/or one or more transceivers.

The flight management system 212 may include a flight control system and navigation system in some implementations. In other implementations, the flight control system and navigation system may be separate from the flight management system 212. In example embodiments, the flight control system can control or automate the tasks of piloting and the flight management system can control or automate the tasks of navigation and guidance according to a flight plan of the aerial vehicle 100. The flight control system can include or be associated with, any suitable number of individual microprocessors, power supplies, storage devices, interface cards, auto flight systems, flight management computers, and other components. The flight control system can include or cooperate with any number of software programs (e.g., flight management programs) or instructions designed to carry out the various methods, process tasks, calculations, and control/display functions necessary for operation of the aerial vehicle 100. The flight control system may be separate from the onboard computing device(s) 202, or can be included with or implemented by the onboard computing device(s) 202.

The aerial vehicle control system(s) 214 can be configured to perform various aerial vehicle operations and control various settings and parameters associated with the aerial vehicle 100. For instance, the aerial vehicle control system(s) 214 can be associated with the one or more engine(s) 130 and/or other components of the aerial vehicle 100. The aerial vehicle control system(s) 214 can include, for instance, digital control systems, throttle systems, inertial reference systems, flight instrument systems, engine control systems, auxiliary power systems, fuel monitoring systems, engine vibration monitoring systems, communications systems, flap control systems, flight data acquisition systems, a flight management system, a landing system, and other systems.

In some implementations, the vehicle control system 214 includes one or more engine controllers. For example, vehicle control system 214 may include an electronic engine controller (EEC) for each engine 130 in some embodiments. In other examples, vehicle control system 214 may include a Full Authority Digital Engine Control (FADEC) system. A FADEC system is often used for aerial vehicles having two or more engines because the FADEC system dynamically controls the operation of each gas turbine engine and requires minimal, if any, supervision from the pilot. The vehicle control system may include other control systems such as a fuel control system including one or more fuel controllers configured to control fuel flow for the one or more engines 130.

Avionics system 210 represents one or more electronic systems of the aerial vehicle configured to perform one or more individual aerial vehicle functions. Examples of avionics systems include communication systems, navigation systems, weather systems, radar systems, air traffic systems, ground proximity warning systems, etc. In some implementations, the avionics system can include or be in communication with a location system. The location system can include a global positioning system (GPS), inertial reference systems, and the like.

The various systems of FIG. 2 may determine aircraft performance data from the sensor data received from the one or more sensors 116. In some implementations, the sensor data includes one or more parameters related to the engines 130, aerial vehicle 100, and/or atmosphere external to the aerial vehicle. In some examples, one or more sensors 116 can communicate one or more detected parameters to the various systems. The vehicle parameters may be included directly within the sensor data or may be derived from the sensor data. By way of example, vehicle parameters may include location (e.g., GPS coordinates), speed, vehicle attitude and/or orientation, rate of climb and/or descent, heading direction, various pressures, temperatures, fuel flow rate, and/or any other information pertaining to the aerial vehicle's current operating condition. The performance data may be stored locally using any suitable storage technology as described. In some examples, the performance data is derived from the aircraft sensor data. For example, multiple location coordinates may be analyzed in order to determine a projected trajectory of the aerial vehicle. In other examples, the performance data may include the aircraft sensor data directly. For example, one or more of the aircraft sensors may directly provide a measure of aerial vehicle speed.

In accordance with embodiments of the present disclosure, the onboard computing system 200 includes a transmission processing system 208. The transmission processing system 208 is configured to processes data transmissions transmitted to the aerial vehicle 100 by a transmitting device associated with an offboard source. For instance, if an incoming data transmission is encrypted, transmission processing system 208 includes features that decrypt the data transmission. Further, in accordance with example aspects of the present disclosure, the transmission processing system 208 includes features that authenticate data transmissions transmitted to the aerial vehicle 100 from offboard transmitting devices associated with offboard sources. Example features of transmission processing system 208 will be described below with reference to FIG. 3.

The onboard computing system 200, including onboard computing devices 202 and the various other systems depicted in FIG. 2, may generally include one or more processor(s) and associated memory configured to perform a variety of computer-implemented functions, such as various methods, steps, calculations and the like disclosed herein. In some examples, control systems such as an engine control system and/or fuel control system may be programmable logic devices, such as a Field Programmable Gate Array (FPGA), however they may be implemented using any suitable hardware and/or software.

The term processor may generally refer to integrated circuits, and may also refer to a controller, microcontroller, a microcomputer, a programmable logic controller (PLC), an application specific integrated circuit (ASIC), a Field Programmable Gate Array (FPGA), and other programmable circuits. Additionally, the memory described herein may generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof.

Any one or a combination of the systems of onboard computing system 200 may also include a communications interface. The communications interface can include associated electronic circuitry that is used to send and receive data. More specifically, the communications interface can be used to send and receive data between any of the various control systems. Similarly, a communications interface at any one of the controllers may be used to communicate with outside components such as another aerial vehicle and/or ground control. A communications interface may be any combination of suitable wired or wireless communications interfaces.

The different systems depicted in FIG. 2 of onboard computing system 200 may be implemented as hardware, software, or as a combination of hardware and software. The software may be stored as processor readable code and implemented in a processor, as processor readable code for programming a processor for example. In some implementations, one or more of the components can be implemented individually or in combination with one or more other components as a packaged functional hardware unit (e.g., one or more electrical circuits) designed for use with other units, a portion of program code (e.g., software or firmware) executable by a processor that usually performs a particular function of related functions, or a self-contained hardware or software component that interfaces with a larger system, for example. Each unit, for example, may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, these components may include software stored in a processor readable device (e.g., memory) to program a processor to perform the functions described herein. The architecture depicted in FIG. 2 is one example implementation. These various computing-based elements may be configured at a single computing device, or may be distributed across multiple computing devices.

Figure 3:
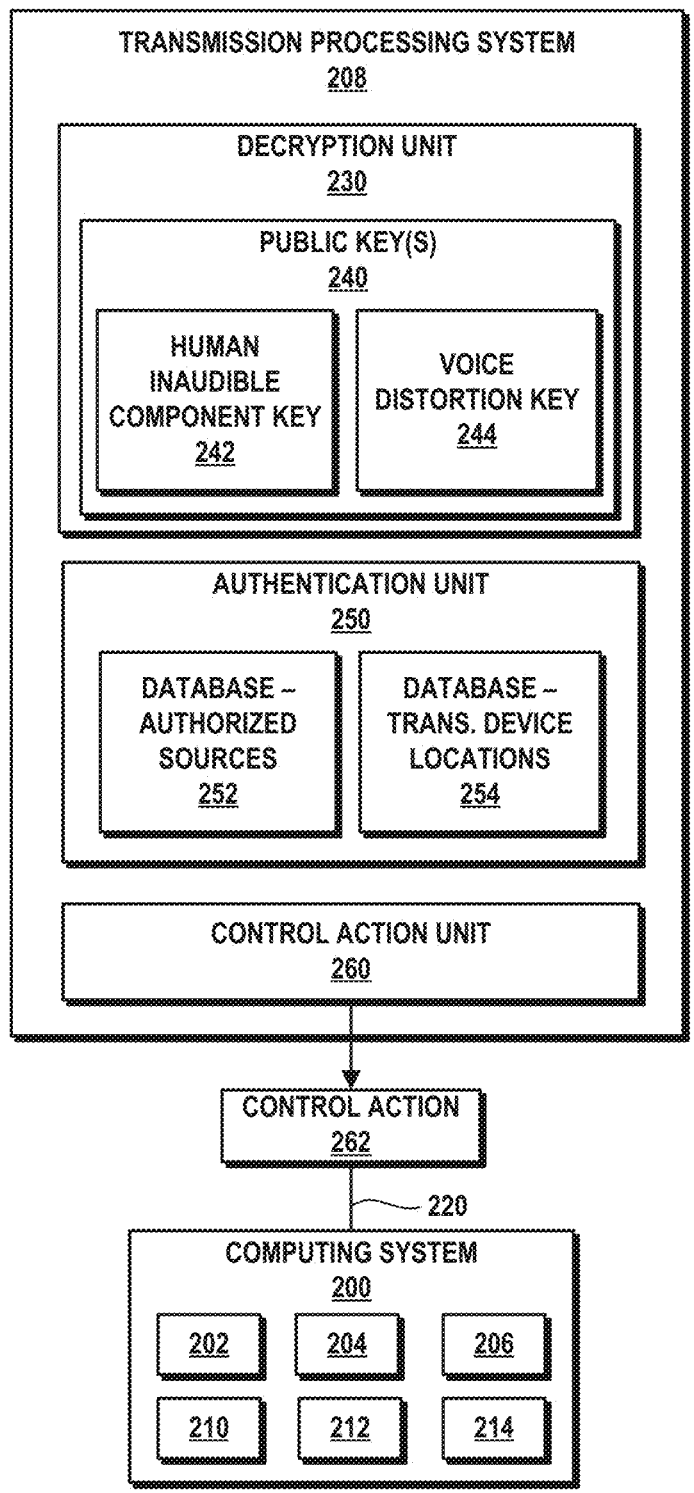
FIG. 3 is a block diagram depicting a transmission processing system of an onboard computing system of an aerial vehicle according to example embodiments of the present disclosure.

FIG. 3 depicts a block diagram that provides additional details of the transmission processing system 208 in accordance with example embodiments of the present disclosure. As shown, transmission processing system 208 includes a decryption unit 230. Decryption unit 230 is configured to decrypt or decode encrypted elements of data transmissions transmitted to the aerial vehicle 100. The decryption unit 230 can include one or more public keys 240 that may decrypt encrypted elements of a data transmission. The public keys 240 may each correspond with a private key of an offboard computing system of the source of the transmission. For this example embodiment, the public keys 240 of the transmission processing system 208 include a human inaudible component key 242 and a voice distortion key 244. As will be explained in detail herein, the human inaudible component key 242 may decrypt human inaudible components introduced or embedded within a voice communication transmitted to the aerial vehicle 100. The voice distortion key 244 may decrypt predetermined voice distortions introduced or embedded within a voice communication transmitted to the aerial vehicle 100. The predetermined voice distortion may be an intentional alteration in the pitch of the voice stream that is detectable by the decryption unit 230 but not by humans. The decryption unit 230 of the transmission processing system 208 may include other public keys 240 as well.

As further depicted in FIG. 3, transmission processing system 208 includes an authentication unit 250. The authentication unit 250 includes an authorized source database 252 and a transmitting device location database 254. The authorized source database 252 includes a list of sources that the aerial vehicle 100 deems to be authorized or trusted. For example, the list of sources can include known airport codes, radio beacons, and other known sources. The transmitting device location database 254 includes a list of known transmitting device locations. That is, the transmitting device location database 254 may correlate a location with each known transmitting device.

The data transmission may include a source identifier that includes a cryptographic identification of the source that generated the data transmission. In such embodiments, once the decryption unit 230 decrypts the encrypted features or portions of the data transmission, the source identifier is known. The computing system 200, and more particularly transmission processing system 208, may then access the authorized source database 252 and determine whether the determined source identifier matches one of the source identifiers of the plurality of authorized sources in the authorized source database 252. In some embodiments, if the determined source does not match one of the authorized sources of the authorized source database 252, then transmission processing system 208 may determine that the source that generated the data transmission is not an authorized or trusted source. However, if the determined source does match one of the authorized sources of the authorized source database 252, then transmission processing system 208 may determine that the source that generated the data transmission is an authorized or trusted source.

Transmission processing system 208 also includes a control action unit 260. The control action unit 260 generates a control action 262 in response to whether the source matches one of the authorized sources of the authorized source database 252. For instance, if it is determined that the source is not authorized, the control action unit 260 may discard or ignore the data transmission. If, on the other hand, it is determined that the source is authorized, the control action unit 260 may control or activate one or more systems or devices of computing system 200, e.g., to present the payload of the data transmission. This may be done automatically, for example. In some embodiments, if the source is an authorized source, the onboard computing system may automatically respond to or take action based on the payload of the data transmission. For example, a communications system of the aerial vehicle may automatically present the voice communication. As another example, the onboard computing system may automatically switch the frequency of radio system of the aerial vehicle. As yet another example, an autopilot system may automatically take control of the aerial vehicle and perform one or more maneuvers, such as e.g., landing the aerial vehicle. As shown in FIG. 3, the control action unit 260 of transmission processing system 208 is communicatively coupled with the other systems of onboard computing system 200 of the aerial vehicle 100. For example, the control action unit 260 may command an audio interface of the communication system 206 to present the voice communication to crew members of the aerial vehicle 100.

In some example embodiments, various systems of the onboard computing system 200 may determine a location of the transmitting device associated with the source that generated the data transmission. In such embodiments, to determine if the transmitting device is authorized or trusted, the determined location of the transmitting device may be compared to the transmitting device location database 254. The computing system 200, and more particularly the transmission processing system 208, accesses the transmitting device location database 254 and then determines whether the determined location of the transmitting device matches one of the locations of the authorized transmitting devices identified in the transmitting device location database 254. In some embodiments, if the determined location does not match one of the locations of the transmitting device location database 254, then transmission processing system 208 may determine that the data transmission is not to be trusted and does not authenticate the data transmission. If the determined location does match one of the locations of the transmitting device location database 254, then transmission processing system 208 may determine that the data transmission may be trusted and authenticates the data transmission. The control action unit 260 may generate an appropriate control action based at least in part on whether the determined location of the transmitting device matches one of the locations of the authorized transmitting devices in the transmitting device location database 254. Example methods are provided below that further detail how data transmissions transmitted to an aerial vehicle may be authenticated.

Figure 4:
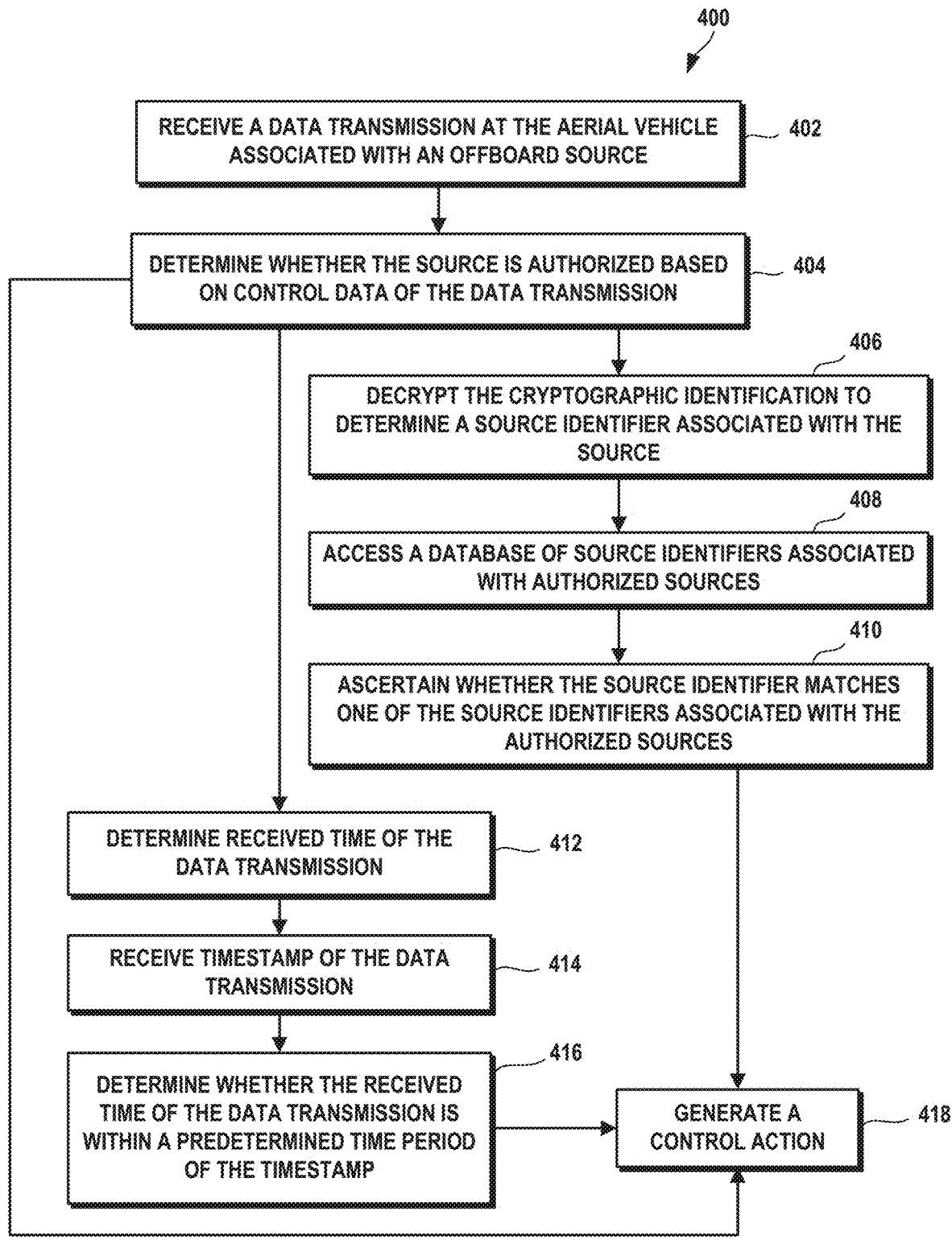
FIG. 4 is a flowchart describing an example process of authenticating a data transmission transmitted to an aerial vehicle according to example embodiments of the present disclosure.

FIG. 4 provides a flowchart of an example method (400) for authenticating a data transmission transmitted to an aerial vehicle from a transmitting device associated with a source positioned offboard of the aerial vehicle in accordance with example embodiments of the present disclosure. In some implementations, method (400) can be implemented by one or more systems of the aerial vehicle of FIG. 1, for example. For instance, the method (400) may be implemented in whole or in part by the onboard computing system 200 of FIG. 2. To provide context to method (400), reference numerals used to describe the features of the aerial vehicle 100 of FIG. 1, the computing system 200 of FIG. 2, and the transmission processing system 208 of FIG. 3 will be used below.

At (402), method (400) includes receiving, by a computing system comprising one or more processors positioned in the aerial vehicle, the data transmission associated with the source, the data transmission comprising a payload and control data indicative of the source. For instance, the computing system may be the onboard computing system 200 of FIG. 2 and the aerial vehicle may be the aerial vehicle 100 of FIG. 1, for example.

Figure 5:
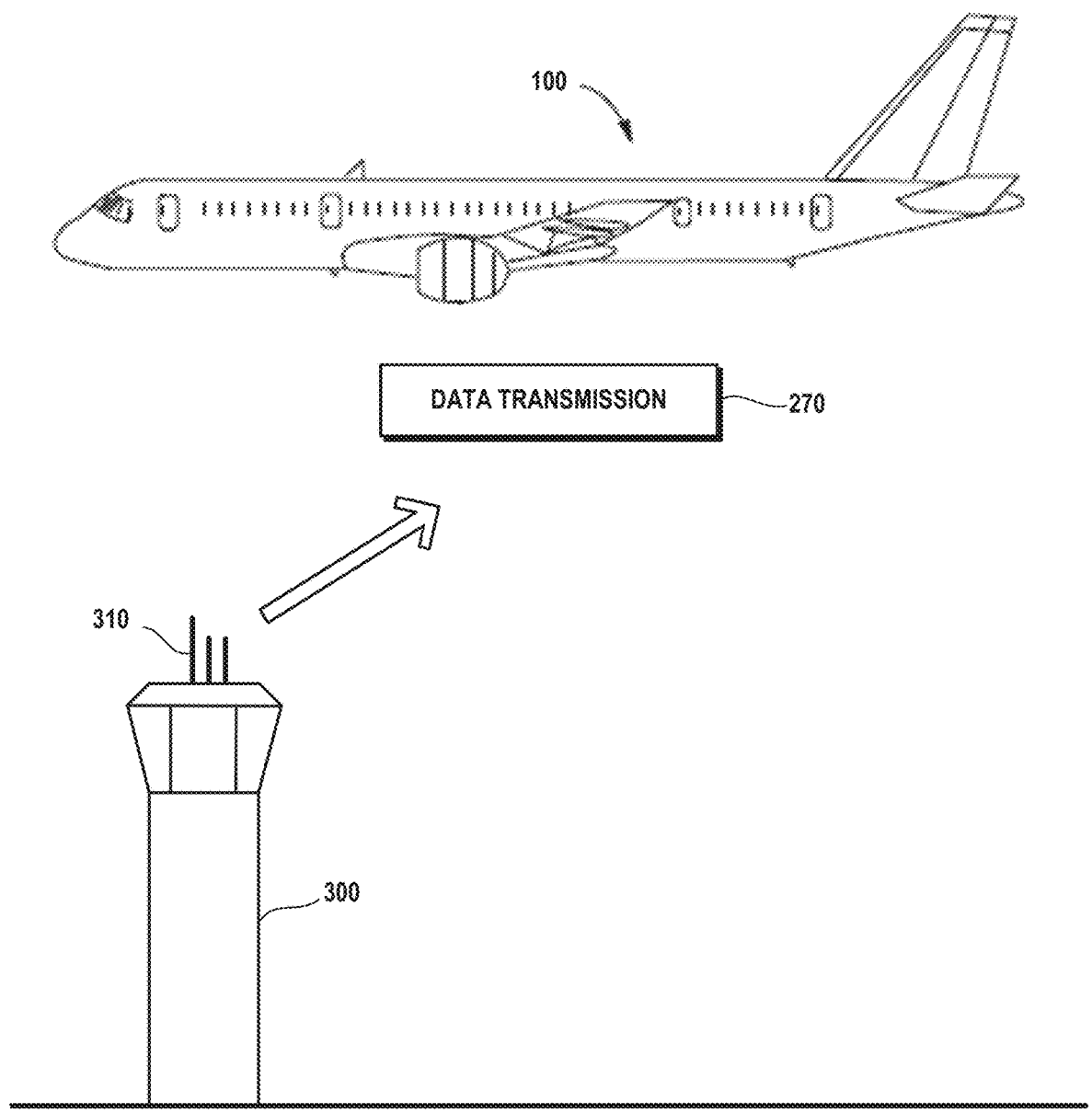
FIG. 5 is a schematic view of an aerial vehicle receiving a data transmission from a transmitting device associated with an offboard source according to example embodiments of the present disclosure.
Figure 6:
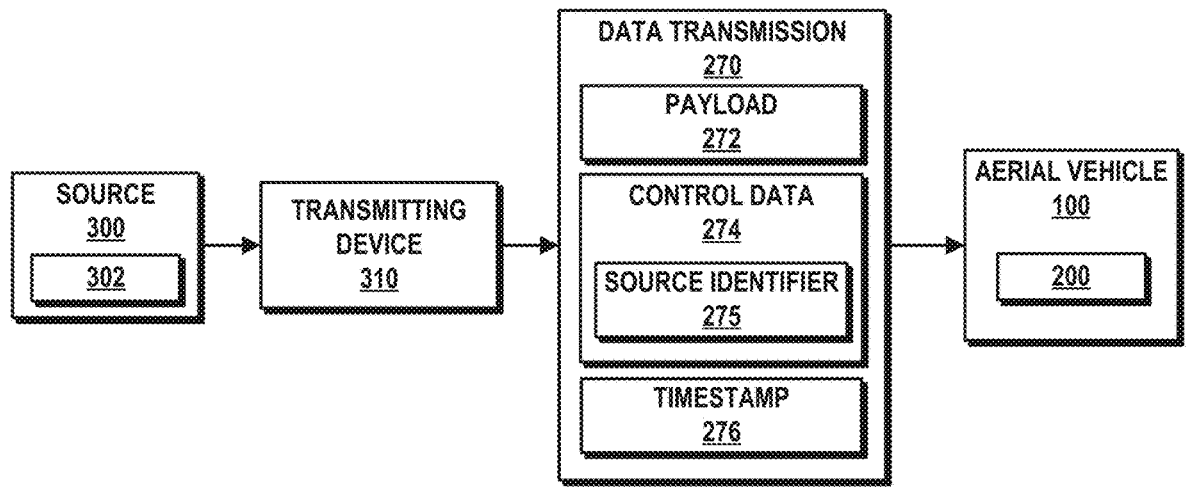
FIG. 6 is a block diagram depicting an aerial vehicle receiving a data transmission from a transmitting device associated with an offboard source according to example embodiments of the present disclosure.

FIGS. 5 and 6 schematically depict an example manner in which a data transmission may be transmitted to and received by an aerial vehicle. As shown, a transmitting device 310 associated with a source 300 positioned offboard of the aerial vehicle 100 transmits a data transmission 270 to the aerial vehicle 100. The source 300 may be a radio or computing system of an air traffic control tower and the transmitting device 310 may be one or more antennas of the control tower.

As shown particularly in FIG. 6, in this example, the data transmission 270 includes a payload 272 and control data 274. The control data 274 may be included as a header, footer, metadata, or as any other information included within or otherwise associated with the data transmission 270. For the depicted embodiment, control data 274 includes a source identifier 275. The source identifier 275 may be indicative of the source 300 in any suitable way, such as e.g., by airport code, by coordinates, by name, by a string of numbers, a combination thereof, etc. The payload 272 represents the message or instructions of the data transmission 270. The message or instructions can be, for example, landing instructions, instructions for performing a step climb, or instructions to the vehicle control system 214 of an unmanned aerial vehicle. Further, as shown in FIG. 6, in some implementations of method (400), the data transmission 270 includes a timestamp 276. The timestamp 276 is indicative of a time the data transmission is transmitted or imminently about to be transmitted from the transmitting device 310 associated with the source 300 to the aerial vehicle 100. In some implementations, the timestamp 276 is assigned a timestamp by a GPS of an offboard computing system 302 associated with the source 300 of the data transmission 270. In some implementations, the timestamp 276 is determined and assigned a timestamp by a GPS of the onboard computing system 200, e.g., the GPS of the avionics system 210.

At (404), with reference again to FIG. 4, the method (400) includes determining, by the computing system, whether the source is authorized based at least in part on the control data of the data transmission. That is, upon receiving the data transmission 270 transmitted by the transmitting device 310 associated with the source 300 at (402), the computing system 200 of the aerial vehicle 100 determines whether the source 300 is authorized based at least in part on the control data 274. More particularly, the transmission processing system 208 of the onboard computing system 200 may be utilized to determine whether the source 300 is authorized.

Figure 7:
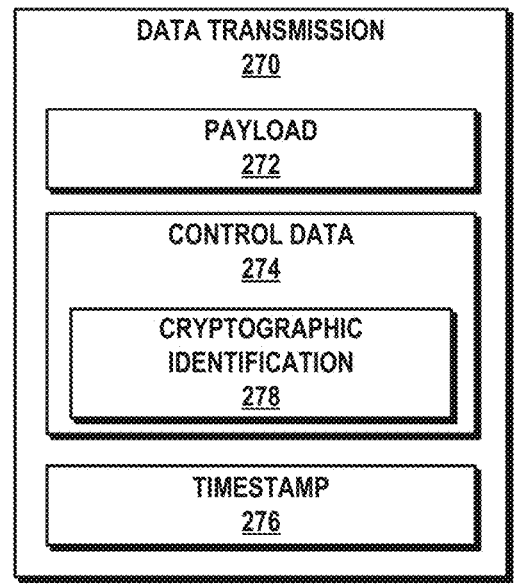
FIG. 7 is a block diagram of an example data transmission having control data that includes a cryptographic identification of a source identifier according to example embodiments of the present disclosure.

In some implementations of method (400), the source identifier of the control data is encrypted as a cryptographic identification. For instance, FIG. 7 provides a block diagram of an example data transmission 270 having control data 274 that includes a cryptographic identification 278 of the source 300 associated with the data transmission 270. By encrypting the source identifier 275, the source identifier 275 is safeguarded as the data transmission 270 is transmitted. An offboard computing system 302 of source 300 (FIG. 6) may use an encryption unit to encrypt the source identifier 275. Further, in some example implementations, the timestamp 276 is encrypted as well and may be included as part of the source identifier 275 that is embedded in the data transmission 270. In other implementations, the timestamp 276 need not be encrypted and may be included as a component embedded in the data transmission 270.

At (406), with reference again to FIG. 4, in determining whether the source 300 is authorized based at least in part on the control data 274 of the data transmission 270, the method (400) may include decrypting the cryptographic identification of the source identifier. For instance, the decryption unit 230 of the transmission processing system 208 (FIG. 3) may be used to decrypt the cryptographic identification 278 of the source identifier 275 (FIG. 7).

At (408), in such implementations, the method (400) may further include accessing a database comprising a plurality of source identifiers associated with a plurality of authorized sources. For instance, the database may be the authorized source database 252 of the authentication unit 250 of the transmission processing system 208 (FIG. 3). As noted previously, the authorized source database 252 includes a list of source identifiers associated with a plurality of sources that the aerial vehicle 100 deems to be authorized or trusted. For instance, the list of sources can include known airport codes, radio beacons, and other known sources. The onboard computing system 200 may access the database 252, e.g., from a memory storage device of one of the computing devices 202 implementing the authentication unit 250.

At (410), in such implementations, method (400) may also include ascertaining whether the source identifier of the data transmission matches at least one of the plurality of source identifiers associated with the plurality of authorized sources. For instance, one or more of the computing devices 202 of the onboard computing system 200 implementing the authentication unit 250 may cross reference the source identifier 275 against the list of source identifiers associated with the authorized sources of the authorized source database 252. If the source identifier 275 of the data transmission 270 matches one of the plurality of source identifiers associated with the authorized sources listed in the authorized source database 252, then the source 300 may be deemed authorized or an authorized source. If, however, the source identifier 275 of the data transmission 270 does not match one of the plurality of source identifiers of the plurality of authorized sources listed in the authorized source database 252, then the source 300 is deemed not an authorized source, or stated differently, the source 300 is deemed an unauthorized source. Thereafter, as will be explained at (418), an appropriate control action 262 may be generated by the control action unit 260 (FIG. 3) of the onboard computing system 200 of the aerial vehicle 100 depending on whether the source identifier 275 matches at least one of the plurality of source identifiers of the plurality of authorized sources listed in the database 252.

Figure 8:
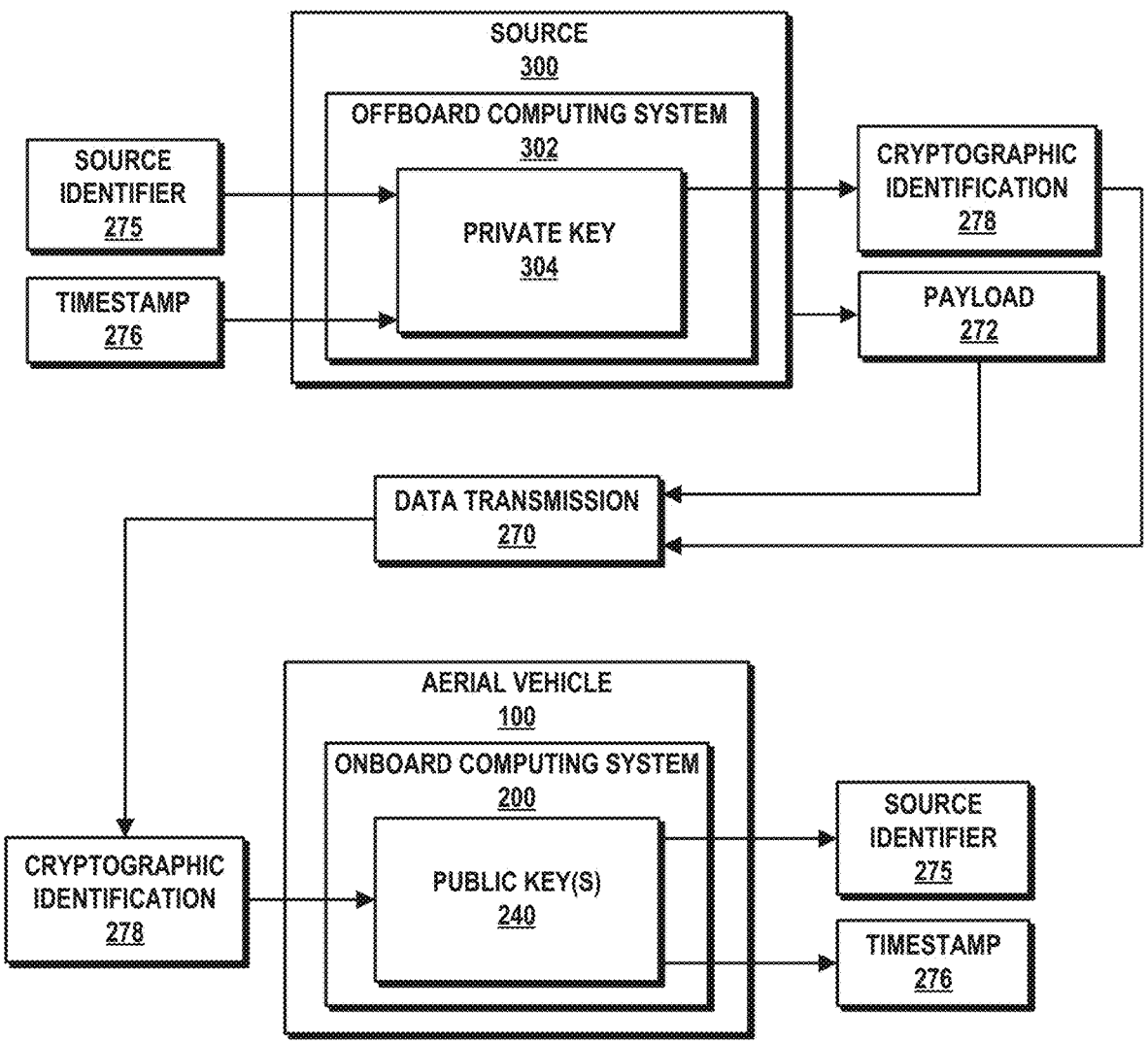
FIG. 8 is a block diagram depicting a private-public key pairing for encrypting and decrypting source identifiers of data transmissions according to example embodiments of the present disclosure.

In some example implementations of method (400), the source identifier is encrypted at the source and decrypted at the aerial vehicle utilizing a private-public key pair technique. By way of example, as shown in FIG. 8, the source 300 positioned offboard of the aerial vehicle 100 includes offboard computing system 302 that has one or more processors or computing devices. The offboard computing system 302 of the source 300 includes a private key 304 that is unique to the source 300. The private key 304 is configured to encrypt at least a portion of the data transmission 270 prior to the onboard computing system 200 of the aerial vehicle 100 receiving the data transmission, e.g., at (402). For instance, for this example, the private key 304 is configured to encrypt the source identifier 275 and the timestamp 276 prior to transmission. The source identifier 275 and the timestamp 276 are input into the private key 304 of the offboard computing system 302, the private key 304 encrypts the inputs, and the private key 304 outputs the cryptographic identification 278 that is indicative of an encrypted source identifier 275 and timestamp 276. The cryptographic identification 278 is then embedded or otherwise introduced into the data transmission 270 with the payload 272. The data transmission 270 is then transmitted to the aerial vehicle 100, e.g., by the transmitting device 310 associated with the source 300.

As further shown in FIG. 8, the onboard computing system 200 of the aerial vehicle 100 includes one or more public keys 240, e.g., as shown in FIGS. 3 and 8. The public key 240 is configured to decrypt at least a portion of the data transmission 270 once the data transmission 270 is received by the onboard computing system 200 of the aerial vehicle 100. For instance, for this example, the public key 240 is configured to decrypt the cryptographic identification 278 embedded or otherwise included in the data transmission 270. As shown, the source cryptographic identification 278 is input into the public key 240 that corresponds with the private key 304 of the source 300, the public key 240 decrypts the input, and the source identifier 275 and the timestamp 276 are output by the one or more computing devices 202 implementing the decryption unit 230 of the transmission processing system 208 of the onboard computing system 200 (FIG. 3). The private-public key technique is one representative manner in which the source identifier 275 may be encrypted and decrypted.

In some example implementations of method (400), the data transmission is a voice communication. For instance, the voice communication may be a voice communication transmitted via an analog radio stream. In such implementations, the cryptographic identification may be embedded into or otherwise introduced into the voice communication as a human inaudible component. In other example implementations, the cryptographic identification may be embedded into or otherwise introduced into the voice communication as a voice distortion component. Examples are provided below.

Figure 9:
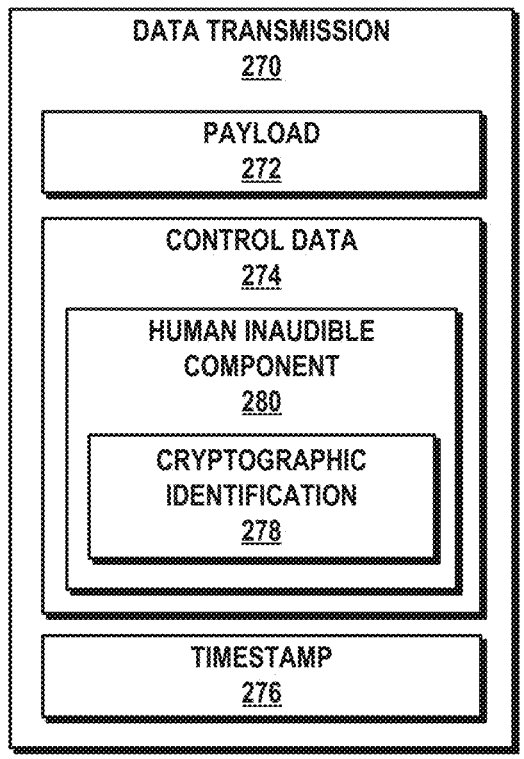
FIG. 9 is a block diagram of an example data transmission that includes a source identifier having a human inaudible component that cryptographically identifies the source of the data transmission according to example embodiments of the present disclosure.

FIG. 9 provides a block diagram of one example data transmission 270 that includes cryptographic identification 278 embedded into the data transmission 270 as a human inaudible component 280. For instance, the human inaudible component 280 may be set to a frequency that is less than or below the human audible range, e.g., less than about fifteen hertz (15 Hz). Alternatively, the human inaudible component 280 may be set to a frequency that is greater than or above the human audible range, e.g., greater than about twenty kilohertz (20 kHz). In such implementations, the human inaudible component key 242 of the decryption unit 230 of the transmission processing system 208 may detect the human inaudible component 280 and decrypt the cryptographic identification 278. In some implementations, the human inaudible component 280 may further include information relating to the timestamp 276 of the data transmission 270. In some implementations, the data transmission 270 may include the source identifier 275 (i.e., an unencrypted identifier of the source 300) embedded into the data transmission 270 as a human inaudible component 280.

Figure 10:
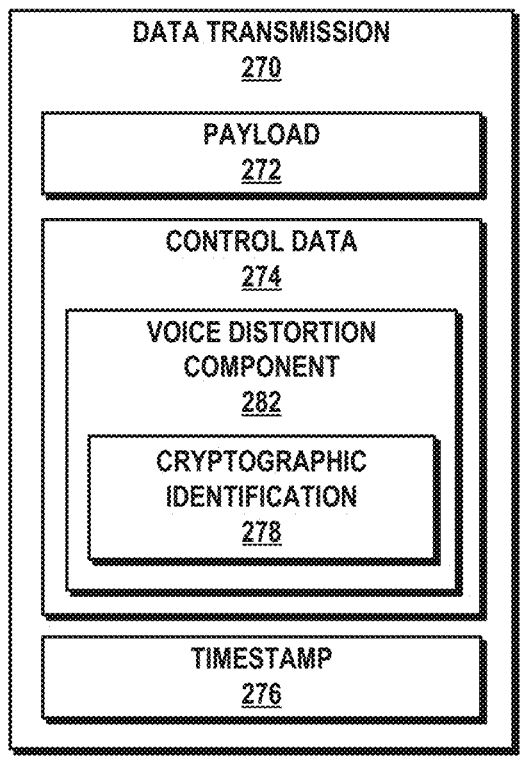
FIG. 10 is a block diagram of an example data transmission that includes a source identifier having a voice distortion component that cryptographically identifies the source of the data transmission according to example embodiments of the present disclosure.

FIG. 10 provides a block diagram of one example data transmission 270 that includes cryptographic identification 278 embedded into the data transmission 270 as a voice distortion component 282. For instance, the voice distortion component 282 may be used to distort the voice communication broadcast over the radio stream, e.g., by altering a pitch of the voice communication. In such implementations, the voice distortion key 244 of the decryption unit 230 of the transmission processing system 208 may detect the voice distortion component 282 and decrypt the cryptographic identification 278. In some implementations, the voice distortion component 282 may further include information relating to the timestamp 276 of the data transmission 270. A private key 304 of the offboard computing system 302 of the source 300 (FIG. 8) that is paired with the voice distortion key 244 may be used to distort the voice communication such that the voice distortion component 282 is detectable by the transmission processing unit 208 of the onboard computing system 200 of the aerial vehicle 100 yet not detectable by humans, e.g., the crew members. The voice distortion key 244 of the public keys 240 of the aerial vehicle 100 may then decrypt the cryptographic identification 278 embedded within the voice distortion component 282 to determine the source identifier 275 of the source 300. Once the source identifier 275 is known, it may be determined whether the source is authorized as noted above at (404). In some implementations, the data transmission 270 may include the source identifier 275 (i.e., an unencrypted identifier of the source 300) embedded into the data transmission 270 as a voice distortion component 282.

At (418), returning now to FIG. 4, the method (400) includes generating, by the computing system, a control action based at least in part on whether the source is authorized. For instance, with reference to FIG. 3, after the cryptographic features of the source identifier are decrypted by the decryption unit 230 and the authentication unit 250 determines whether the source 300 is an authorized or trusted source so that it may ultimately be determined whether the data transmission 270 should be authenticated, control action 262 may be generated by the control action unit 260 of the transmission processing system 208. In some implementations, for example, generating the control action includes presenting the payload to an aircrew member of the aerial vehicle if the source is authorized. As another example, if the source is determined not to be authorized, the control action includes discarding or ignoring the data transmission without presenting the payload to the aircrew members.

Further, in some implementations, as noted previously, the data transmission may include a timestamp indicative of a time the data transmission is transmitted by the transmitting device associated with the source. Introducing a time element into the data transmission may prevent malicious actors from copying data transmissions transmitted from authorized sources to aerial vehicles and then replaying them back to the aerial vehicle or other aerial vehicles at a later time. Thus, in some implementations, the control action may be generated based at least in part on the timestamp. An example implementation in which the control action is generated based at least in part on the timestamp is provided below.

Figure 11:
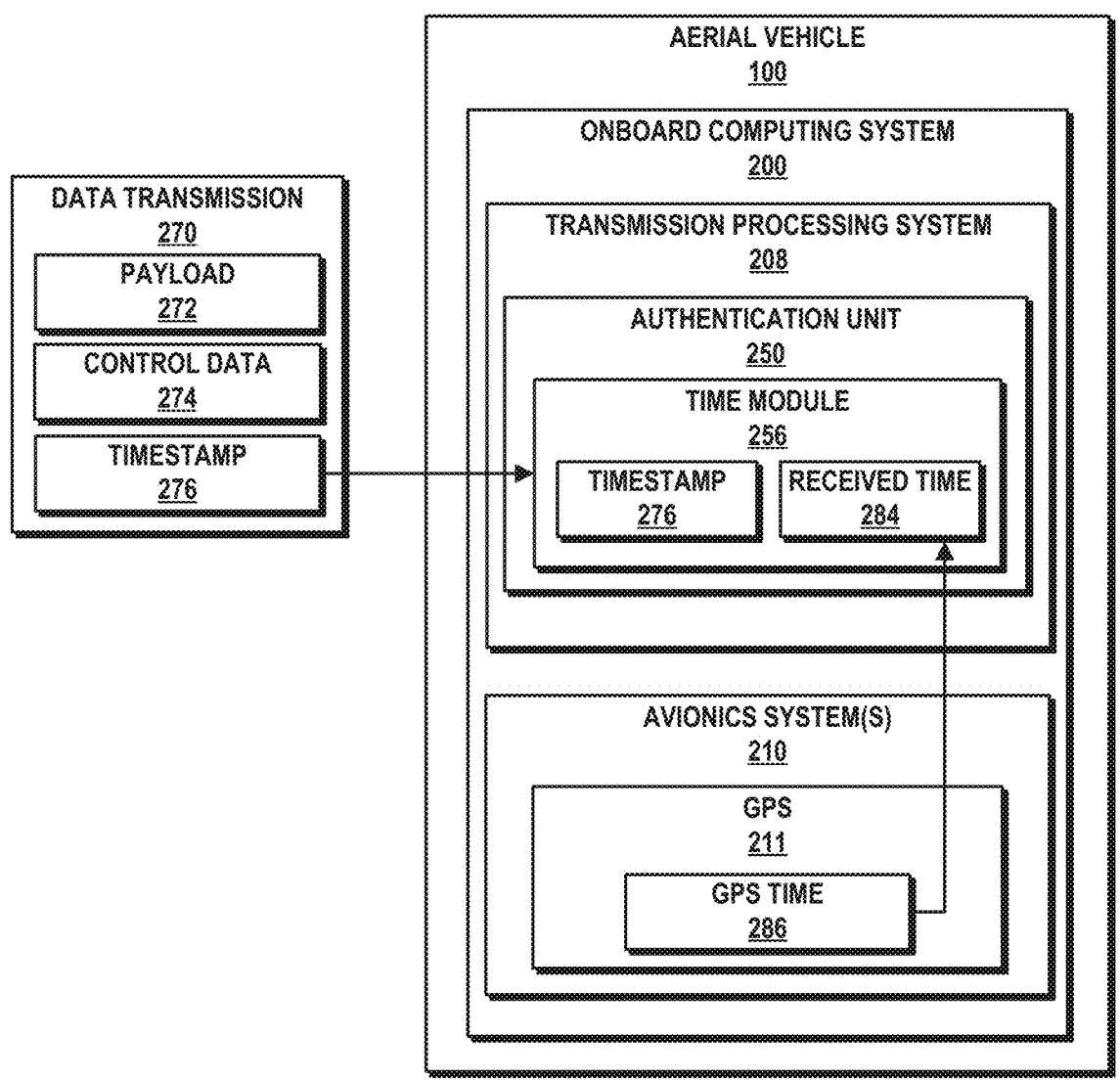
FIG. 11 is a block diagram depicting an onboard computing system of an aerial vehicle receiving and storing a received time indicative of a time in which a data transmission was received by the aerial vehicle according to example embodiments of the present disclosure.

At (412), with reference again to FIG. 4, method (400) may include determining, by the computing system of the aerial vehicle, a received time indicative of a time the data transmission was received by the aerial vehicle. For instance, FIG. 11 provides a block diagram of the onboard computing system 200 of the aerial vehicle 100 determining a received time 284 indicative of a time in which the data transmission 270 was received by the aerial vehicle 100. As shown, a GPS 211 of the avionics system 210 may keep a GPS time 286. The GPS time 286 may be forwarded to a time module 256 of the authentication unit 250 of the transmission processing system 208 of the onboard computing system 200. When the aerial vehicle 100 receives the data transmission 270, the current GPS time 286 is logged as the received time 284 by the time module 256. In this way, the received time 284 is determined based on the GPS time 286. The received time 284 may be stored in one or more memory devices of one or more of the computing devices 202 implementing time module 256.

At (414), with reference again to FIG. 4, method (400) may include storing, by the computing system, the timestamp indicative of a time in which the data transmission was transmitted by the transmitting device associated with the source. For instance, as shown in FIG. 11, the timestamp 276 of the data transmission 270 is received by the time module 256 of the authentication unit 250 of the onboard computing system 200.

At (416), with reference again to FIG. 4, after receiving and storing the received time 284 at (412) and receiving and storing the timestamp 276 at (414), the method (400) may include determining, by the computing system, whether the received time of the data transmission is within a predetermined time period of the timestamp, and wherein the control action is generated based at least in part on whether the received time of the data transmission is within the predetermined time period of the timestamp. As noted above, the control action may be generated at (418) based at least in part on whether the received time of the data transmission is within the predetermined time period of the timestamp. In some example implementations, if the received time of the data transmission is within the predetermined time period of the timestamp, then the aerial vehicle has received the data transmission within a period that ensures that the data transmission was not copied and replayed by a malicious actor or inadvertently re-sent from an authorized source. Accordingly, a control action consistent with a finding that the source is authorized may be generated. If, however, the received time of the data transmission is not within the predetermined time period of the timestamp, then the time period between when the data transmission was transmitted and when the aerial vehicle received the data transmission was too long. Accordingly, in such implementations, the control action may include ignoring the data transmission, even if the data transmission was or was supposedly transmitted by a transmitting device associated with an authorized source.

Figure 12:
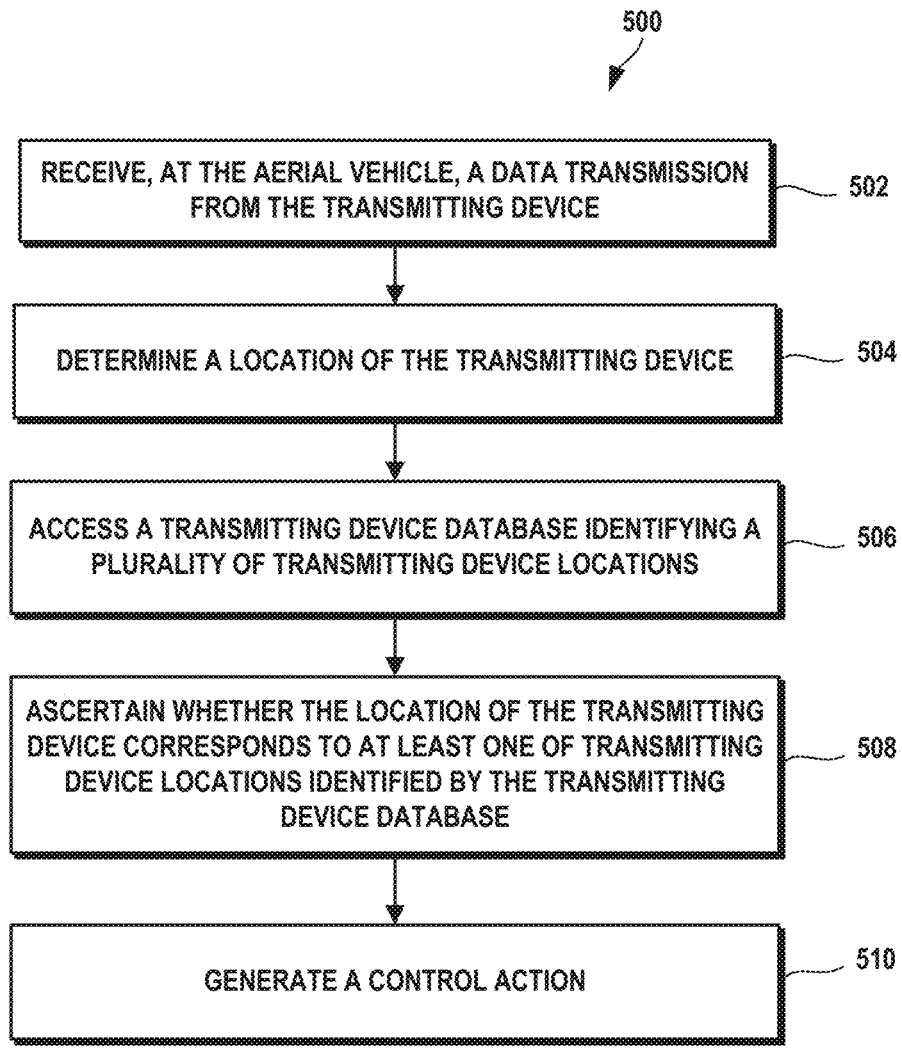
FIG. 12 is a flowchart describing another process of authenticating a data transmission transmitted to an aerial vehicle according to example embodiments of the present disclosure.

FIG. 12 provides a flow diagram for an example method (500) for authenticating a data transmission received at an aerial vehicle from a transmitting device associated with a source. In some implementations, method (500) can be implemented by one or more systems of the aerial vehicle of FIG. 1. For instance, the method (500) may be implemented in whole or in part by the onboard computing system 200 of FIG. 2. To provide context to method (500), reference numerals used to describe the features of the aerial vehicle 100 of FIG. 1, the computing system 200 of FIG. 2, and the transmission processing system 208 of FIG. 3 will be used below. Further, reference may be made to FIGS. 5 through 11.

At (502), method (500) includes receiving, at the aerial vehicle, the data transmission from the transmitting device. For instance, as shown in FIG. 6, one or more receiving devices of the aerial vehicle 100 may receive the data transmission 270 from the transmitting device 310. For instance, the receiving devices may be the first and second antennas 122, 124 of the aerial vehicle 100 of FIG. 1. The data transmission 270 may then be routed over communication network 220 (FIG. 2) to computing system 200, where the data transmission 270 may be received by one or more systems or devices of onboard computing system 200, such as e.g., computing device 202 implementing transmission processing system 208 (FIG. 3). Thus, onboard computing system 200 receives the data transmission 270.

At (504), method (500) includes determining a location of the transmitting device. The location of the transmitting device 310 may be determined in a number of suitable manners, such as e.g., a triangulation technique, a trilateration technique, a triangulateration, a multilateration technique, or some combination thereof.

Figure 13A:
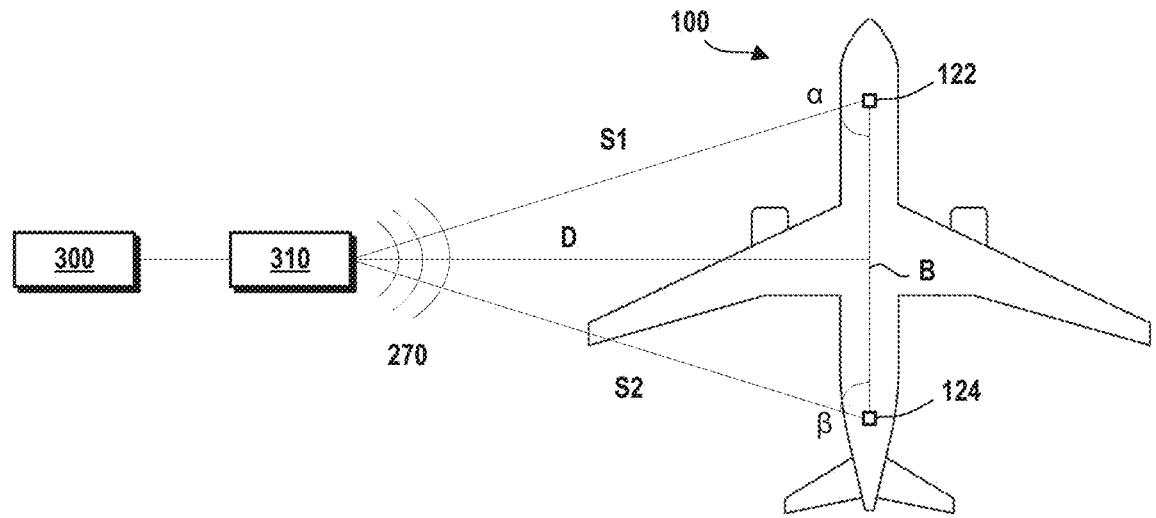
FIGS. 13A, 13B, and 13C are schematic diagrams illustrating example triangulation techniques for determining the location of a transmitting device associated with a source according to example embodiments of the present disclosure.

As one example, a triangulation technique may be utilized to determine the location of the transmitting device. In some implementations, the aerial vehicle includes at least two receiving devices, e.g., such as the first and second antennas 122, 124 of the aerial vehicle 100 of FIG. 1. With reference to FIG. 13A, as shown, in determining the location of the transmitting device 310 that transmitted the data transmission 270 to the aerial vehicle 100, method (500) includes receiving, at a first receiving device 122 on the aerial vehicle 100, a first signal S1 of the data transmission 270. Method (500) also includes receiving, at a second receiving device 124 on the aerial vehicle 100, a second signal S2 of the data transmission 270. The second receiving device 124 is spaced from the first receiving device 122, as noted above. A baseline B is a fixed distance defined between the first receiving device 122 and the second receiving device 124, e.g., as shown in FIG. 13A. Method (500) also includes, determining a first angle incidence α of the data transmission 270 with respect to the baseline B. As one example, the first angle incidence α may be determined based on a phase difference between the first signal S1 received by the first receiving device 122 and the second signal S2 received by the second receiving device 124. As another example, the first angle incidence α may be determined by first receiving device 122 beamforming. That is, first receiving device 122 may include features for detecting the first angle of incidence α. Further, method (500) includes determining a second angle incidence β of the data transmission 270 with respect to the baseline B. As one example, the second angle incidence β may be determined based on the phase difference between the first signal S1 received by the first receiving device 122 and the second signal S2 received by the second receiving device 124. As another example, the second angle incidence α may be determined by second receiving device 124 beamforming. Method (500) also includes triangulating, based on the first angle of incidence α and the second angle of incidence β, an actual distance D between the aerial vehicle 100 and the transmitting device 310. As the aerial vehicle 100 knows its own position (e.g., via GPS) and the first angle of incidence α and the second angle of incidence β, the actual distance D may be determined. The actual distance D may then be stored in a memory device of one or more of the computing devices 202 of onboard computing system 200. Further, the position of the transmitting device 310 relative to the aerial vehicle 100 may also be determined. Thus, the location of the transmitting device 310 relative to the aerial vehicle 100 may be determined.

Figure 13B:
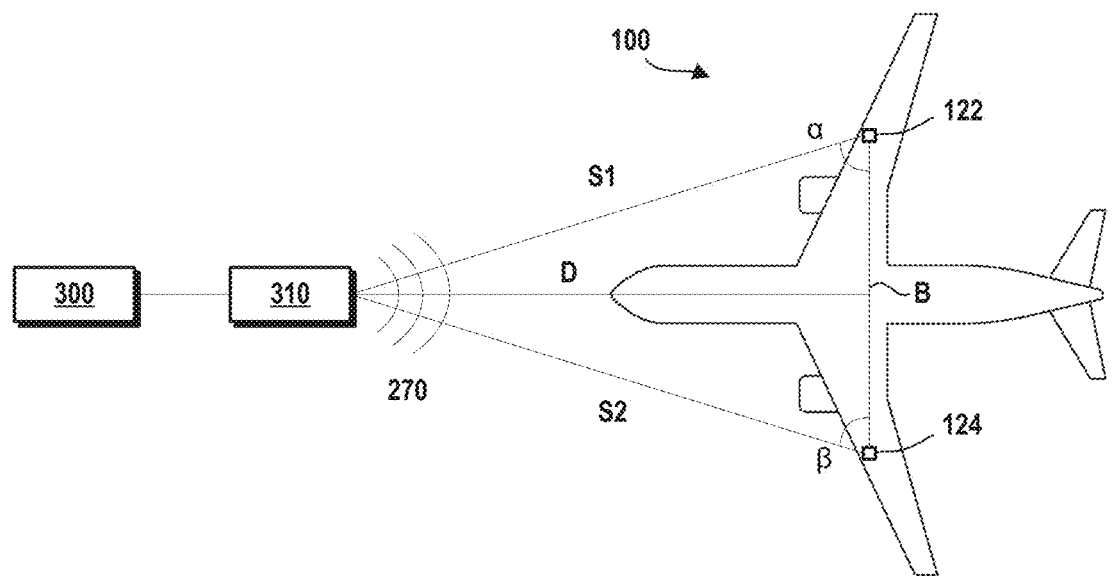
Figure 13C:
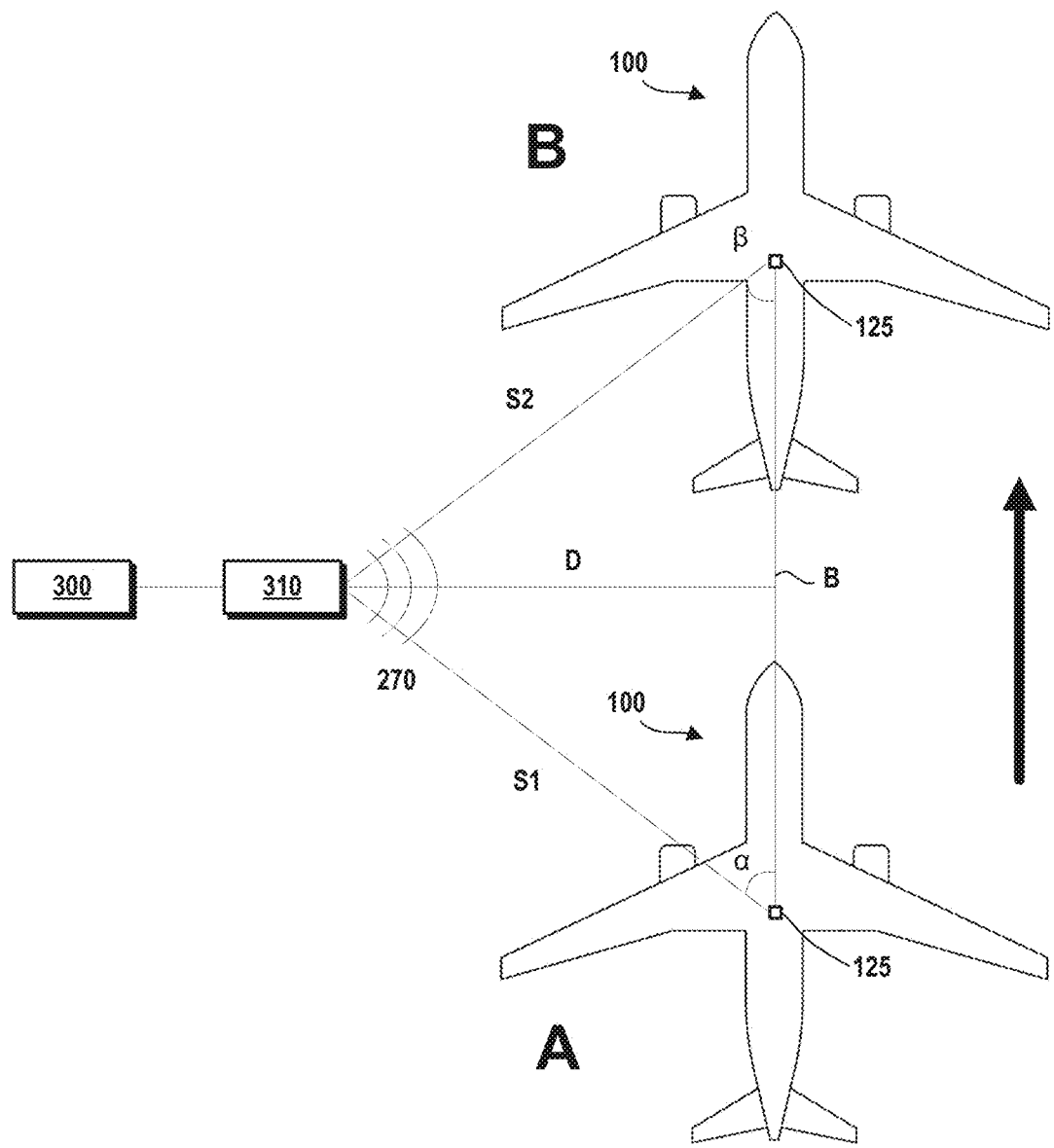

In other example implementations, other triangulation techniques may be used. For instance, as shown in FIG. 13B, the first and second receiving devise 122, 124 may each be placed on an opposing wing of the aerial vehicle 100. To determine the actual distance between the aerial vehicle 100 and the transmitting device 310 associated with the source 300, a similar technique described above with reference to FIG. 13A may be used. In yet other example implementations, as shown in FIG. 13C, a triangulation method may be used to determine the actual distance D between the aerial vehicle 100 and the transmitting device 310 using a single receiving device 125. When the aerial vehicle 100 is at position A, the receiving device 125 may receive a first signal S1 from the transmitting device 310. The first angle of incidence α may be determined by the receiving device 125 at position A, e.g., by beamforming. Thereafter, when the aerial vehicle 100 travels to position B, the second angle of incidence β is determined by the receiving device 125. In such embodiments, the onboard computing system 200 calculates the distance traveled between positions A and B and determines the actual distance D based on the distance traveled and the first angle of incidence α and the second angle of incidence β.

Figure 14A:
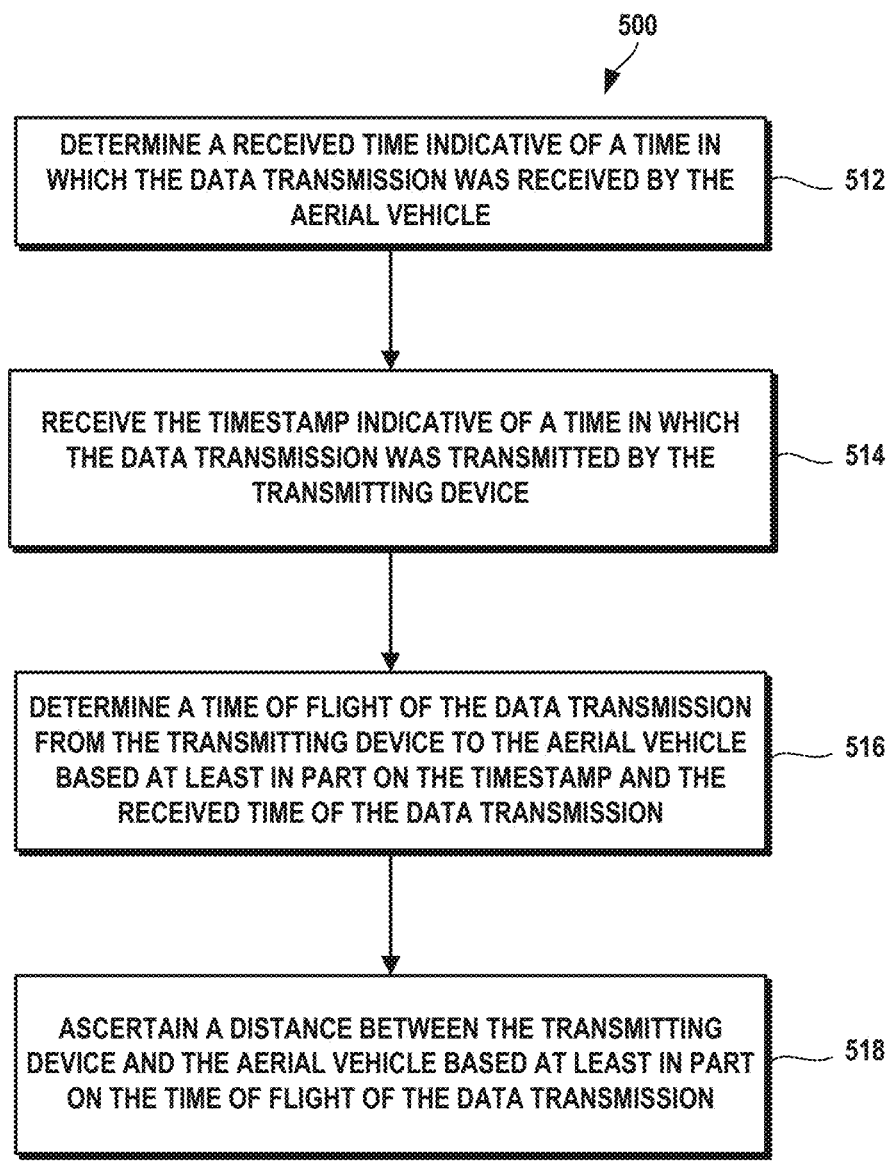
FIGS. 14A, 14B, and 14C provide example trilateration techniques for determining the location of a transmitting device associated with a source according to example embodiments of the present disclosure.

As another example, a trilateration technique may be utilized to determine the location of the transmitting device. In such implementations of method (500), as shown in FIG. 14A, in determining the location of the transmitting device that transmitted the data transmission to the aerial vehicle 100, at (512), method (500) includes receiving a received time indicative of a time in which the data transmission was received by the aerial vehicle. For instance, as shown in FIG. 11, the received time may be received by the onboard computing system 200 of the aerial vehicle 100. The received time 284 may be based on the GPS time 286. The received time 284 may be received and stored in one or more memory devices of one or more of the computing devices 202 implementing time module 256 of authentication unit 250. At (514), method (500) also includes receiving the timestamp indicative of a time in which the data transmission was transmitted by the transmitting device. For instance, as shown in FIG. 11, the timestamp 276 of the data transmission 270 is received by the time module 256 of the authentication unit 250 of the onboard computing system 200. At (516), method (500) may include determining a time of flight of the data transmission from the transmitting device to the aerial vehicle based at least in part on the timestamp and the received time of the data transmission. For instance, the time of flight of the data transmission equates to the time associated with the timestamp and the time associated with the received time. Further, at (518), method (500) includes ascertaining an actual distance between the transmitting device and the aerial vehicle based at least in part on the time of flight of the data transmission. For instance, as the speed of the data transmission is known (i.e., at or about at the speed of light) and the actual distance is known between the aerial vehicle and time it took the data transmission to travel from the transmitting device to the aerial vehicle, the actual distance may be determined. The distance may be further utilized in method, e.g., at (508). Once the distance is known, the direction of the transmitting device with respect to the aerial vehicle may be determined by one or both of the receiving devices 122, 124, e.g., if they have directional capability, or the direction of the transmitting device 310 with respect to the aerial vehicle 100 may be determined by sampling multiple times of flight to establish if the signals are getting stronger or weaker with flight direction.

Figure 14B:
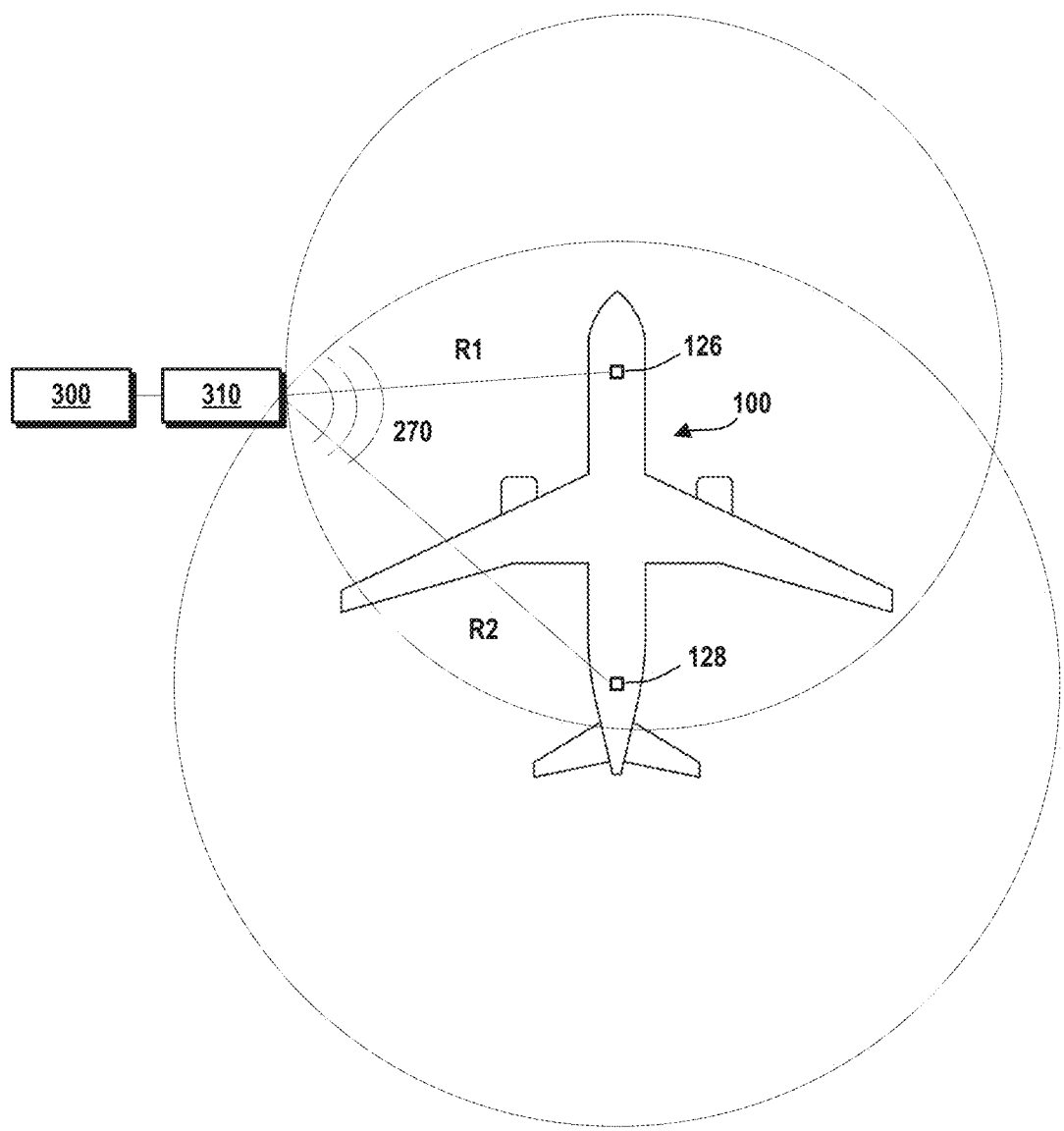

As depicted in FIG. 14B, another example trilateration technique is schematically depicted. As shown, the aerial vehicle 100 includes a first sensor 126 and a second sensor 128 spaced from the first sensor 126. The first sensor 126 is configured to sense or measure the distance between the transmitting device 310 and the first sensor 126 and likewise the second sensor 128 is configured to sense or measure the distance between the transmitting device 310 and the second sensor 128. Once the distances are determined, the transmitting device 310 is within a radius R1 of the first sensor 126 and the transmitting device 310 is within a radius R2 of the second sensor 128. The transmitting device 310 is at a location where the two circles or radii intersect. As shown in FIG. 14B, the circles intersect at two points. To determine the correct intersection and thus the correct location of the transmitting device 310, the directional ability in one or both sensors 126, 128 may be utilized or multiple times in flight may be used to establish if signal is getting stronger or weaker with flight direction. In alternative embodiment, three, four, or more sensors may be used to pinpoint the location of the transmitting device 310 with respect to the aerial vehicle 100.

Figure 14C:
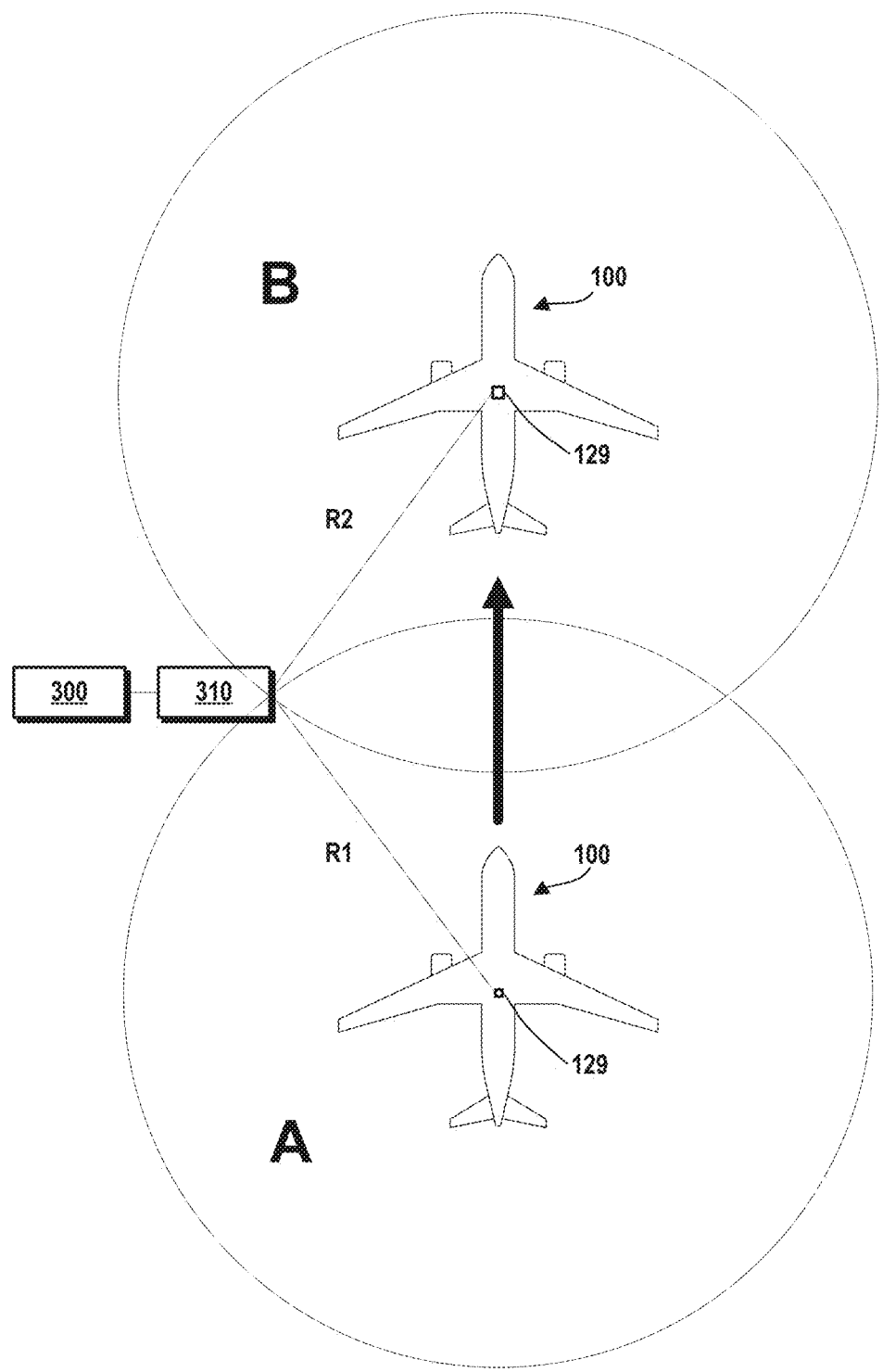

As depicted in FIG. 14C, another example trilateration technique is schematically depicted. As shown, the aerial vehicle 100 includes a single sensor 129 configured to sense or measure the distance between the transmitting device 310 and the sensor 129. At position A, the sensor 129 senses or measures the distance between the transmitting device 310 and the sensor 129. Thus, when the aerial vehicle 100 is at position A, the transmitting device 310 is within a radius R1 of the sensor 129. After the aerial vehicle 100 travels to position B, the sensor 129 senses or measures the distance between the transmitting device 310 and the sensor 129 once again. Thus, when the aerial vehicle 100 is at position B, the transmitting device 310 is within a radius R2 of the sensor 129. The transmitting device 310 is at a location where the two circles or radii intersect. As shown in FIG. 14C, the circles intersect at two points. To determine the correct intersection and thus the correct location of the transmitting device 310, the directional ability of sensor 129 may be utilized or a time of flight analysis may be utilized, e.g., as described and illustrated at FIG. 14A and the accompanying text. Further, in some implementations, known broadcasting power of the transmitting device 310 may be utilized to pinpoint its location. For instance, sensor 129 may be configured to measure received power of the signal or data transmission from the transmitting device 310. The broadcasting power of transmitting devices 310 associated with authorized sources may be stored in a database. To determine the proper intersection of the circles and thus the location of the transmitting device 300, the measured power may be correlated with known broadcasting power of transmitting devices. Further, in some embodiments, three, four, or more sensors may be used to pinpoint the location of the transmitting device 310 with respect to the aerial vehicle 100. Further, as noted above, a triangulateration technique may be utilized to determine the location of the transmitting device. For instance, the triangulation techniques embodied in any one of FIGS. 13A, 13B, and 13C may be used in conjunction with any one of the trilateration techniques embodied in FIGS. 14A, 14B, and 14C. Moreover, a multilateration technique may be utilized to determine the location of the transmitting device.

At (506), returning to FIG. 12, method (500) includes accessing a transmitting device database identifying a plurality of transmitting device locations. Once the location of the transmitting device is known as determined at (504), the onboard computing system 200 accesses transmitting device database 254 (FIG. 3) that identifies a plurality of transmitting device locations. That is, the transmitting device database 254 correlates a list of locations (e.g., coordinates) with transmitting devices that are known and trusted transmitting devices that are associated with authorized or trusted sources.

At (508), method (500) includes ascertaining whether the location of the transmitting device corresponds to at least one of the plurality of transmitting device locations identified by the transmitting device database. With reference again to FIG. 3, with the transmitting device location database 254 accessed, the authentication unit 250 of the onboard computing system 200 ascertains whether the determined location of the transmitting device 310 (FIG. 5) matches one of the plurality of transmitting device locations of the transmitting device location database 254. In some implementations, the list of transmitting device locations includes only trusted or authorized transmitting devices. In such implementations, if the determined location of the transmitting device matches one of the transmitting device locations of the database 254, the authentication unit 250 may deem the transmitting device authorized or trusted. If, one the other hand, the determined location of the transmitting device does not match one of the transmitting device locations of the database 254, the authentication unit 250 may deem the transmitting device 310 unauthorized or not a trusted transmitting device.

In some implementations, the transmitting device location database 254 may include a list of known transmitting devices that are associated with a malicious source. In such implementations, method (500) may include ascertaining not only whether the determined location of the transmitting device matches the location of one of the "authorized" transmitting devices, but method (500) may also include ascertaining whether the determined location of the transmitting device matches the location of a transmitting device known to be associated with a malicious source. For instance, the database 254 may include an ignore list.

At (510), method (500) includes generating a control action based at least in part on whether the location of the transmitting device corresponds to at least one of the plurality of transmitting device locations. For instance, the control action unit 260 may generate control action 262 (FIG. 3). In some implementations, if the location of the transmitting device does in indeed match one of the plurality of transmitting device locations of the transmitting device database, then the data transmission may be deemed authenticated as the data transmission was transmitted via a known transmitting device, and accordingly, the control action may include presenting the data transmission to crew members of the aerial vehicle. If, on the other hand, the location of the transmitting device does not match one of the plurality of transmitting device locations of the transmitting device database, then the data transmission may not be authenticated, and as result, the control action may include ignoring the data transmission. If the location of the transmitting device matches one of the locations on the ignore list, the control action may include ignoring the transmission and logging the malicious attempt to contact the aerial vehicle.

In some implementations of method (500), the source identifier of the transmission may be utilized in conjunction with the location of the transmitting device determined at (504) to authenticate data transmissions transmitted to an aerial vehicle. Example implementations are provided below.

Figure 15:
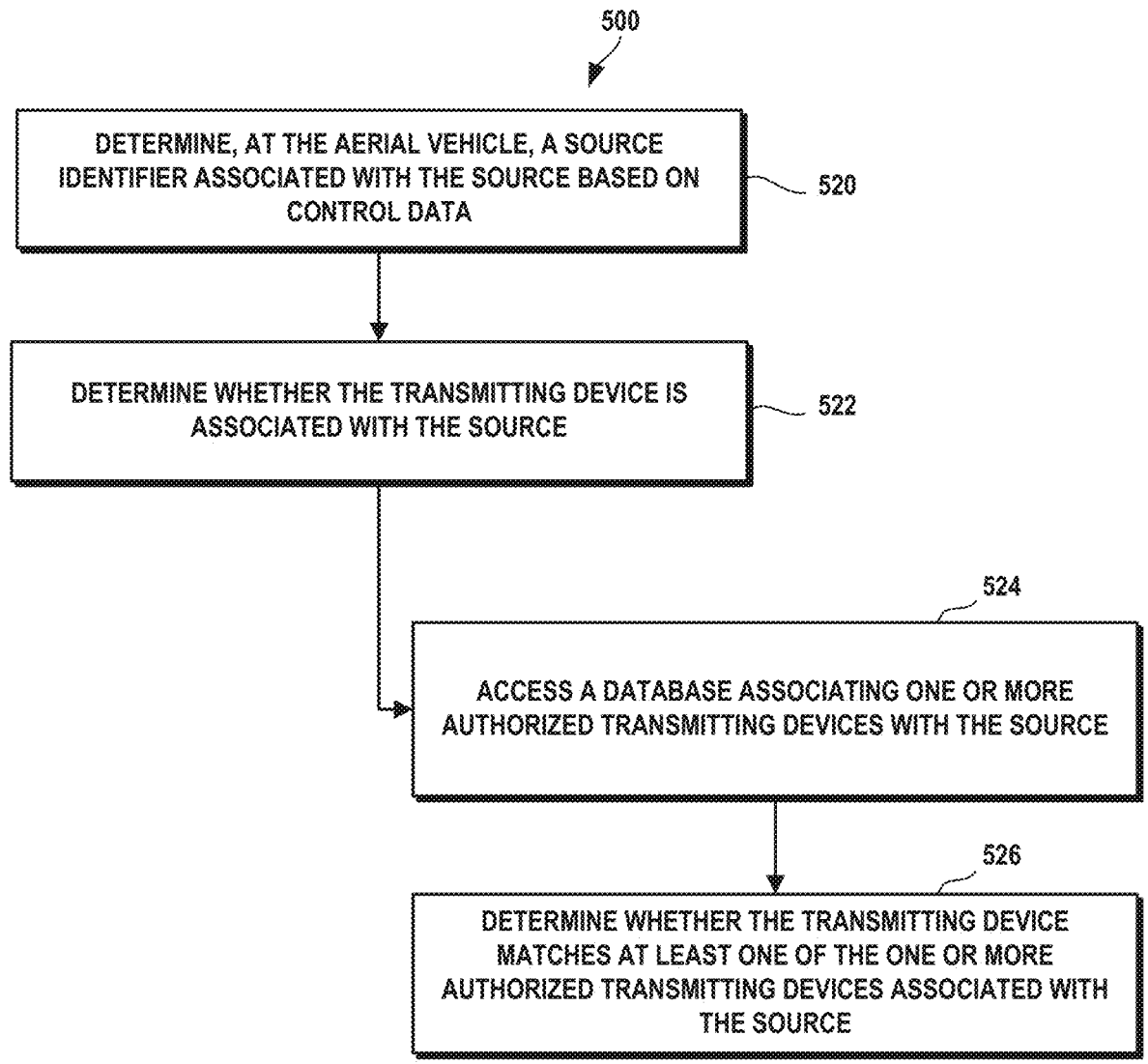
FIG. 15 is a flowchart describing further implementations of the method of FIG. 12.

FIG. 15 provides a flow diagram depicting further example implementations of method (500). In such implementations, the data transmission includes control data indicative of the source of the data transmission. For example, the control data may include a source identifier. As another example, the control data may include a cryptographic identification that is indicative of an encrypted source identifier. The control data may include a human inaudible component that includes the source identifier or an encrypted version of the source identifier, e.g., a cryptographic identification. Additionally or alternatively, the control data may include a voice distortion component that includes the source identifier or a cryptographic identification.

At (520), method (500) may further include determining, by a computing system comprising one or more processors positioned in the aerial vehicle, a source identifier associated with the source based at least in part on the control data. The source identifier is indicative of the source. For instance, the source identifier may be determined based on any of the methods or techniques described above with reference to method (400). For instance, in some implementations, the source identifier may be encrypted as a cryptographic identification of the source of the data transmission, e.g., as shown in FIG. 7. Further, in some implementations, the data transmission is a voice communication and a voice distortion component of the voice communication includes the cryptographic identification. In other implementations, the data transmission is a voice communication and a human inaudible component of the voice communication includes the cryptographic identification. In determining the source identifier, the method (500) may include decrypting the cryptographic identification to determine the source identifier. For instance, the decryption unit 230 of the transmission processing system 208 depicted in FIG. 3 may be utilized to decrypt the cryptographic identification of the source identifier of the incoming data transmission.

At (522), method (500) may also include determining, by the computing system, whether the transmitting device is associated with the source based at least in part on the source identifier and the location of the transmitting device. In such implementations, the control action is generated based at least in part on whether the transmitting device is associated with the source.

At (524), in some implementations, determining, by the computing system, whether the transmitting device is associated with the source based at least in part on the source identifier and the location of the transmitting device at (522) includes accessing, by the computing system, a database associating one or more authorized transmitting devices with the source.

At (526), method (500) includes determining, by the computing system and based on the location of the transmitting device, whether the transmitting device matches at least one of the one or more authorized transmitting devices associated with the source. In such implementations, the control action is generated based at least in part on whether the transmitting device matches the at least one of the one or more authorized transmitting devices associated with the source.

Figure 16:
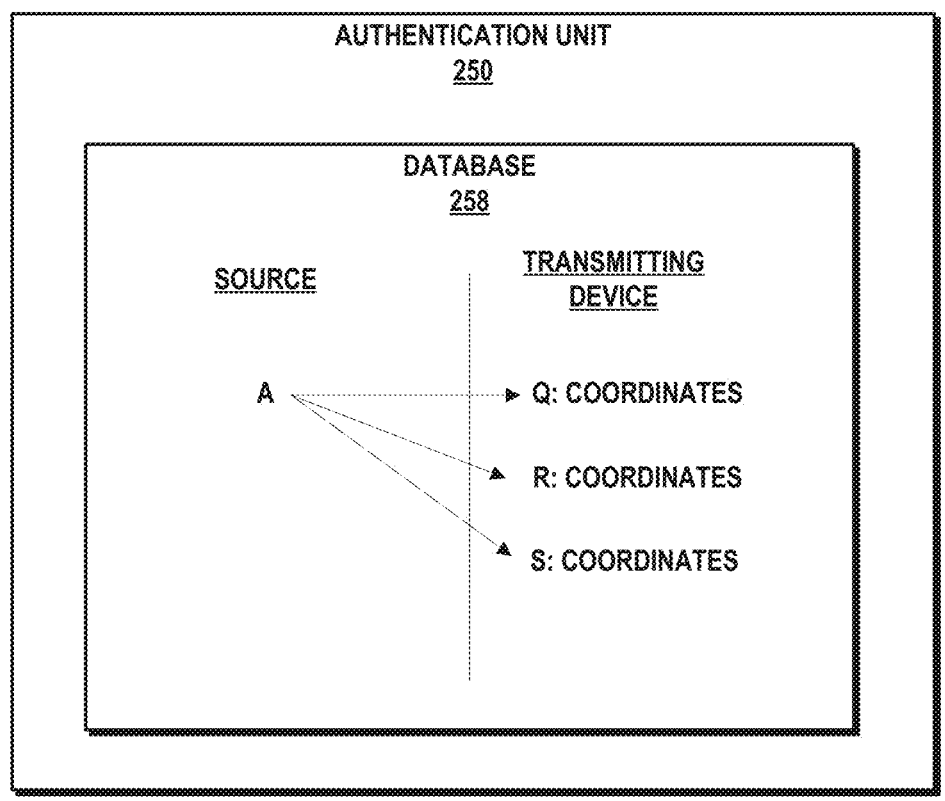
FIG. 16 is a block diagram of an example database used for correlating transmitting devices and sources according to example embodiments of the present disclosure.

FIG. 16 provides an example manner in which it may be determined whether the transmitting device is associated with the source based at least in part on the control data and the location of the transmitting device. As shown in FIG. 16, authentication unit 250 includes a database 258 that correlates one or more authorized transmitting devices associated with the source. In this example, suppose the source identifier 275 was determined at (520) (FIG. 15) to be "A" and that the location of the transmitting device determined at (504) (FIG. 12) has coordinates associated with transmitting device "Z". Authentication unit 250 accesses database 258 and determines that source identifier A has three (3) known authorized or trusted transmitting devices associated with it, including transmitting device Q, transmitting device R, and transmitting device S. Each of the transmitting devices Q, R, and S each have associated coordinates. In this example, authentication unit 250 determines that transmitting device "Z" is not an authorized transmitting device of source identifier A, as only transmitting devices Q, R, and S are authorized transmitting devices. Accordingly, as the transmitting device does not match one of the authorized transmitting devices associated with the source identifier, a control action may be generated accordingly at (510) (FIG. 12). In this way, if a malicious actor copies a transmission from an authorized source and transmits the data transmission utilizing an unauthorized transmitting device, then such implementation of method (500) may thwart the malicious actor's intentions of sending rogue communications to the aerial vehicle. Further, in some implementations, for additional protection, the database 258 may comprise a rolling list of authorized transmitting devices that is synced with various authorized sources. For instance, transmitting devices Q, R, and S may become active or inactive at certain time periods or other transmitting devices may be added or subtracted from the database 258 at certain predetermined time intervals.

Figure 17:
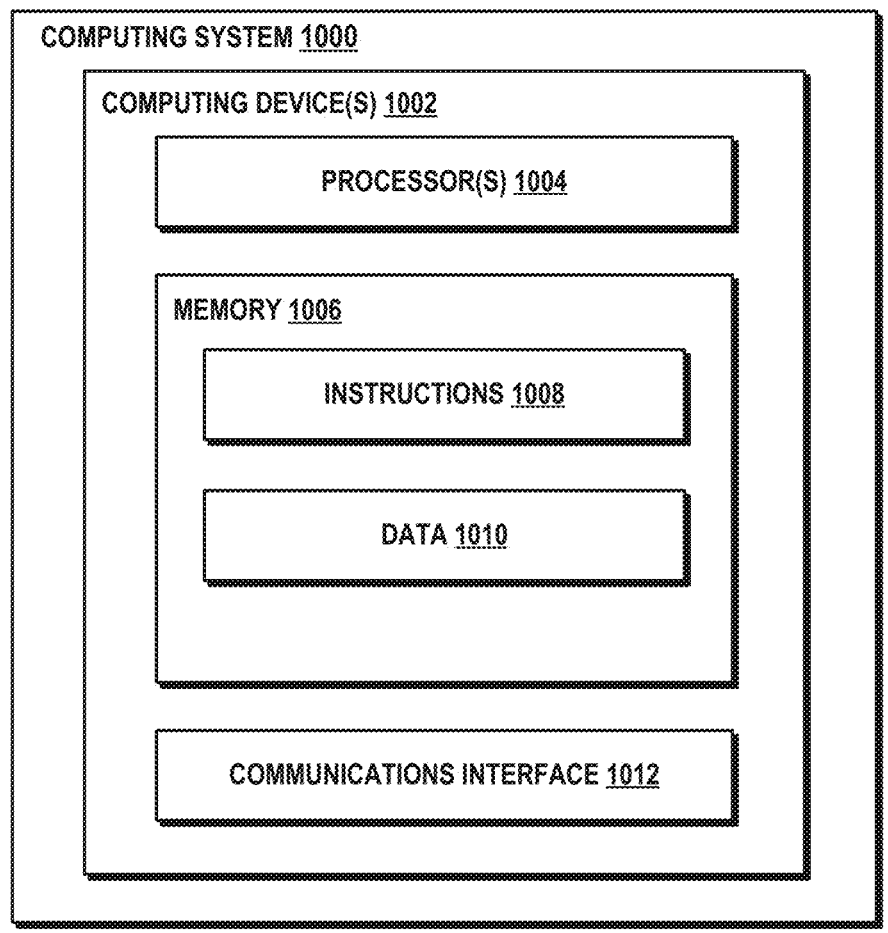
FIG. 17 depicts a block diagram of an example of a computing system in which example aspects of the present disclosure may be implemented.

FIG. 17 depicts a block diagram of an example computing system 1000 that can be used to implement methods and systems according to example embodiments of the present disclosure. Computing system 1000 is one example of an onboarding computing device 202 or offboard computing system 302, however any suitable computing system may be used. Computing system 1000 may be used to implement display system 204, communications system 206, transmission processing system 208, avionics systems 210, flight management system 212, and/or vehicle control system 214. It will be appreciated, however, that computing system 1000 is one example of a suitable computing system for implementing the computing elements described herein.

As shown, the computing system 1000 can include one or more computing device(s) 1002. The one or more computing device(s) 1002 can include one or more processor(s) 1004 and one or more memory device(s) 1006. The one or more processor(s) 1004 can include any suitable processing device, such as a microprocessor, microcontroller, integrated circuit, logic device, or other suitable processing device. The one or more memory device(s) 1006 can include one or more computer-readable media, including, but not limited to, non-transitory computer-readable media, RAM, ROM, hard drives, flash drives, or other memory devices.

The one or more memory device(s) 1006 can store information accessible by the one or more processor(s) 1004, including computer-readable instructions 1008 that can be executed by the one or more processor(s) 1004. The instructions 1008 can be any set of instructions that when executed by the one or more processor(s) 1004, cause the one or more processor(s) 1004 to perform operations. The instructions 1008 can be software written in any suitable programming language or can be implemented in hardware. In some embodiments, the instructions 1008 can be executed by the one or more processor(s) 1004 to cause the one or more processor(s) 1004 to perform operations, such as the operations for controlling the transmission rate of an ADT device, and/or any other operations or functions of the one or more computing device(s) 1002.

The memory device(s) 1006 can further store data 1010 that can be accessed by the processors 1004. For example, the data 1010 can include sensor data such as engine parameters, model data, logic data, etc., as described herein. The data 1010 can include one or more table(s), function(s), algorithm(s), model(s), equation(s), etc. according to example embodiments of the present disclosure.

The one or more computing device(s) 1002 can also include a communication interface 1012 used to communicate, for example, with the other components of system. The communication interface 1012 can include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the claimed subject matter, including the best mode, and also to enable any person skilled in the art to practice the claimed subject matter, including making and using any devices or systems and performing any incorporated methods. The patentable scope of the disclosed technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for authenticating a data transmission originating from a source and received at a vehicle, the method comprising:
   receiving, at the vehicle, the data transmission from a transmitting device positioned offboard of the vehicle, the data transmission (i) being a voice communication and (ii) including payload data and control data, the control data including a cryptographic identification of the source;
   wherein the cryptographic identification of the source of the control data is embedded as a human inaudible component of the voice communication with the payload data into the data transmission; and
   wherein an audio processing device is configured to detect the human inaudible component;
   decrypting the cryptographic identification of the source, thereby identifying the source;
   determining whether the source is authorized based on the decrypted cryptographic identification; and
   generating a control action based on whether the identified source is authorized.

2. The method of claim 1, wherein determining whether the source is authorized based on the control data of the data transmission comprises:
   accessing a database comprising a plurality of source identifiers associated with a plurality of authorized sources; and
   ascertaining whether a source identifier of the data transmission matches at least one of the plurality of source identifiers associated with the plurality of authorized sources.

3. The method of claim 1, wherein the data transmission comprises a timestamp indicative of a time the data transmission was transmitted by a transmitting device associated with the source, and wherein the control action is generated based at least in part on the timestamp.

4. The method of claim 3, further comprising:
   determining a received time indicative of a time the data transmission was received by the vehicle; and
   determining whether the received time of the data transmission is within a predetermined time period of the timestamp, and wherein the control action is generated based at least in part on whether the received time of the data transmission is within the predetermined time period of the timestamp.

5. The method of claim 1, wherein the human inaudible component is greater than about twenty kilohertz (20 kHz).

6. The method of claim 1, wherein a computing system of the vehicle comprises a public key associated with a private key of the source, and wherein the computing system of the vehicle is configured to use the public key to decrypt at least a portion of the data transmission encrypted by the source with the private key.

7. The method of claim 1, wherein if the source is authorized, generating the control action comprises presenting the payload data to an aircrew member of the vehicle.

8. The method of claim 1, wherein the data transmission is an analog radio stream.

9. A system for a vehicle, comprising:
   a communications system positioned onboard the vehicle and configured to receive data transmitted from a source external to the vehicle; and
   a computer including one or more computing devices configured to:
      receive the transmitted data, the transmitted data (i) being a voice communication and (ii) including payload data and control data including a cryptographic identification of the source; wherein the cryptographic identification of the source of the control data is embedded as a human inaudible component of the voice communication with the payload data into a data transmission; and wherein the one or more computing devices comprises an audio processing device configured to:
- detect the human inaudible component;
- decrypt the cryptographic identification of the source, thereby identifying the source;
- determine whether the source is authorized based on the decrypted identification; and generate a control action based on whether the identifier source is authorized.

10. The system of claim 9, wherein the computer comprises a decryption unit comprising one or more public keys associated with a private key of the source, and wherein the one or more public keys comprise a human inaudible key for decrypting the human inaudible component embedded within the voice communication.

11. The method of claim 1, wherein the cryptographic identification of the source is a modulation of a carrier signal being overlaid onto the data transmission such that the carrier signal is at a frequency that is inaudible to a human.

12. The method of claim 11, wherein the cryptographic identification modulates the carrier signal at a higher harmonic than the payload data.

\* \* \* \* \*